US009609120B2

(12) United States Patent
Bennett

(10) Patent No.: US 9,609,120 B2
(45) Date of Patent: Mar. 28, 2017

(54) CRISIS NEGOTIATION TELEPHONE

(71) Applicant: World Emergency Network—Nevada Ltd., Carson City, NV (US)

(72) Inventor: Christopher Ryan Bennett, St. Petersburg, FL (US)

(73) Assignee: World Emergency Network—Nevada, Ltd., Carson City, NV (US)

( * ) Notice: Subject to any disclaimer, the term of this patent is extended or adjusted under 35 U.S.C. 154(b) by 237 days.

(21) Appl. No.: 14/609,995

(22) Filed: Jan. 30, 2015

(65) Prior Publication Data
US 2015/0222746 A1    Aug. 6, 2015

Related U.S. Application Data

(60) Provisional application No. 61/934,580, filed on Jan. 31, 2014.

(51) Int. Cl.
*H04M 1/24*   (2006.01)
*H04M 15/00*  (2006.01)
*H04M 1/56*   (2006.01)
*H04M 15/06*  (2006.01)
*H04M 3/22*   (2006.01)
*H04W 4/16*   (2009.01)
*H04W 4/06*   (2009.01)
(Continued)

(52) U.S. Cl.
CPC ........ *H04M 3/2281* (2013.01); *H04L 63/304* (2013.01); *H04W 4/06* (2013.01); *H04W 4/16* (2013.01); *H04L 63/302* (2013.01); *H04M 2242/04* (2013.01); *H04W 12/06* (2013.01)

(58) Field of Classification Search
CPC .... H04M 1/72536; H04M 4/025; H04M 4/22; H04M 76/007; H04M 88/02; H04M 1/72519; H04M 1/72575; H04M 2207/12; H04M 3/2281; H04M 3/51; H04M 3/5175; H04M 10/0404; H04M 3/18; H04M 3/2272; H04K 2203/16; H04K 3/226; H04K 3/28; H04K 3/41; H04K 3/42; H04N 7/141; H04N 7/00; G02F 1/133512; G02F 1/133514; H04B 1/3877
USPC ..... 379/7, 32.01, 35, 93.02, 142.04, 142.05, 379/142.06, 133, 134
See application file for complete search history.

(56) References Cited

U.S. PATENT DOCUMENTS 5,757,889 A * 5/1998 Ohtake ............... H04M 3/2272
                                                    379/12
5,764,728 A * 6/1998 Ala .................... H04M 3/2281
                                                    379/112.01
(Continued)

*Primary Examiner* — Binh Tieu
(74) *Attorney, Agent, or Firm* — Fenwick & West LLP

(57) ABSTRACT

A negotiator makes and receives calls and SMS with a subject through a virtual number. Parties of individuals serving specialized functions are optionally dialed in to monitor the call/receive the SMS each time those communications occur. Alternatively, a member of a particular party can dial in ahead of a call and be placed in a waiting room for the party until the call happens. Different parties may have different functions. For example, one party may be configured such that members can discuss amongst themselves while hearing the negotiator and the subject communicate. Another party may be configured such that communications among the members is disabled such that each member only hears audio from the negotiator and subject.

21 Claims, 10 Drawing Sheets

(51) Int. Cl.
*H04L 29/06* (2006.01)
*H04W 12/06* (2009.01)

(56) References Cited

U.S. PATENT DOCUMENTS

| | | | | |
|---|---|---|---|---|
| 6,229,887 | B1 * | 5/2001 | Albers | H04M 3/2281 |
| | | | | 379/207.02 |
| 9,137,352 | B2 * | 9/2015 | Otto | H04N 7/141 |
| 9,277,052 | B2 * | 3/2016 | Bennett | H04M 3/42221 |
| 2010/0255771 | A1 * | 10/2010 | Otto | H04K 3/226 |
| | | | | 455/1 |
| 2013/0149990 | A1 * | 6/2013 | Otto | H04W 4/22 |
| | | | | 455/404.2 |
| 2014/0315596 | A1 * | 10/2014 | Otto | H04N 7/141 |
| | | | | 455/552.1 |
| 2015/0215254 | A1 * | 7/2015 | Bennett | H04L 51/12 |
| | | | | 709/206 |

* cited by examiner

Map Virtual
Number
350A

| Mapping Table 360A | | |
|---|---|---|
| Authentication Number (Transmitting Number) 361A | Crisis Negotiation Number 363 | Party 365 |
| 555-111-2222 ↔ | 555-999-8888 ↔ | Negotiator |
| 555-111-2223 ↔ | 555-999-8888 ↔ | Subject |
| 555-111-2224 ↔ | 555-999-8888 ↔ | Monitor, Party A |

FIG. 3B

Map Virtual
Number
350B

| Mapping Table 360B | | |
|---|---|---|
| Authentication Number PIN 361B | Crisis Negotiation Number 363 | Party 365 |
| 12345 ↔ | 555-999-8888 ↔ | Negotiator |
| 54321 ↔ | 555-999-8888 ↔ | Party A |
| 23532 ↔ | 555-999-8888 ↔ | Party B |

FIG. 3C

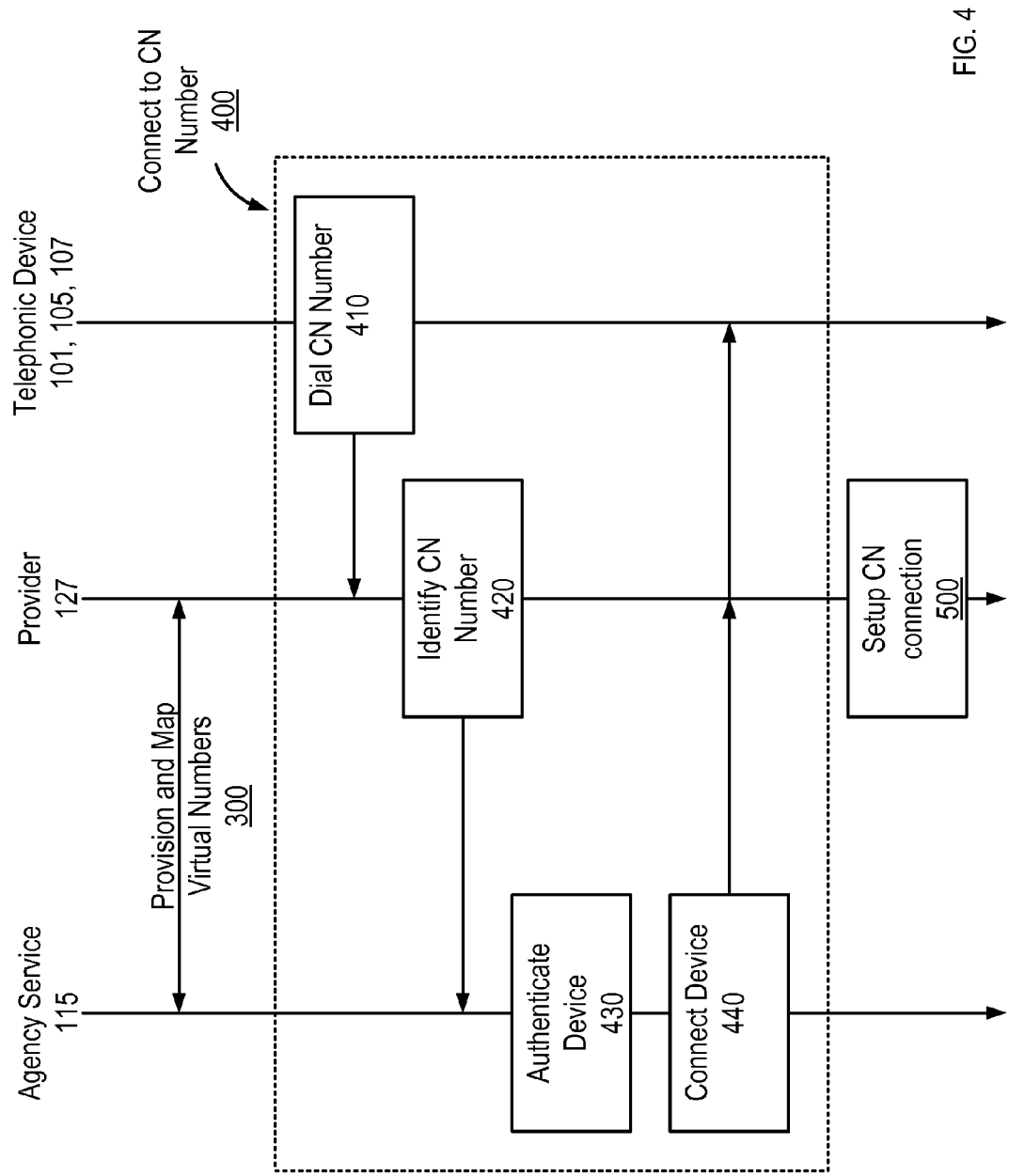

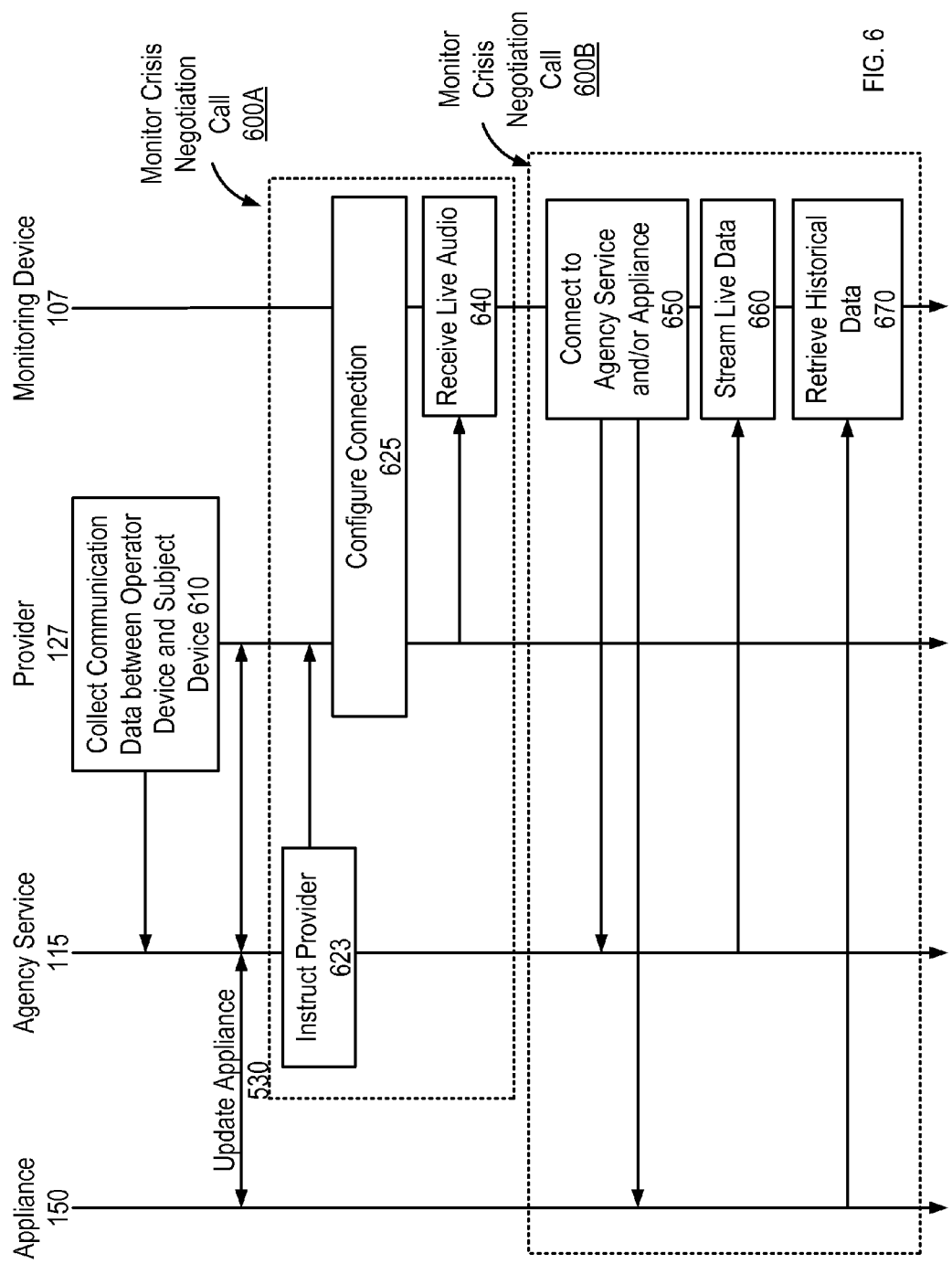

CRISIS NEGOTIATION TELEPHONE

CROSS REFERENCE TO RELATED APPLICATIONS

This application claims the benefit of U.S. Provisional Application No. 61/934,580, filed Jan. 31, 2014, which is incorporated by reference herein in its entirety.

BACKGROUND

1. Field of Art

The present disclosure generally relates to the field of establishing recorded communications between a negotiator and subject.

2. Background of the Invention

In a crisis situation, such as when a subject holds another person hostage or where a subject threatens their own life, negotiators often need to establish communications with the subject. Traditionally, the negotiator uses a communication device which is referred to as a "throw phone" to communicate with the subject. The device is aptly named due to the phone-like appearance and because negotiators often literally throw the device to the subject to establish a dedicated line of communication. Unlike an actual phone system, however, the throw phone utilizes a proprietary secured wireless or wired two-way communications channel rather than the public switching telephone network (PSTN) or network of a wireless carrier. Consequently, the negotiator must be on site to begin engaging in communications with the subject.

While the throw phone advantageously provides a secure and direct line of communication, the drawbacks are numerous. First, the device itself is cost prohibitive for many agencies lacking access to funding for such a device or do not have a demonstrated need justifying the cost. Second, due to the cost, many agencies have only one or a limited number of such devices. Accordingly, the throw phone may not be readily deployable and further require special technicians knowledgeable in its use for operation. Lastly, remote monitoring or negotiation using the traditional throw phone system can prove difficult as personnel must be physically present. These shortcomings decrease the ability of responding personnel to immediately establish communications between the subject and the negotiator in a crisis situation.

BRIEF DESCRIPTION OF THE DRAWINGS

The teachings of the embodiments can be readily understood by considering the following detailed description in conjunction with the accompanying drawings.

FIG. 3B and FIG. 3C are tables illustrating example embodiments of virtual number mapping for providing a crisis negotiation service.

FIG. 4 is an interaction diagram illustrating a method for connecting a device with a crisis negotiation (CN) number according to one example embodiment.

FIG. 6 is an interaction diagram illustrating a method of monitoring communications in crisis negotiation according to one example embodiment.

DETAILED DESCRIPTION

Figure 1A:
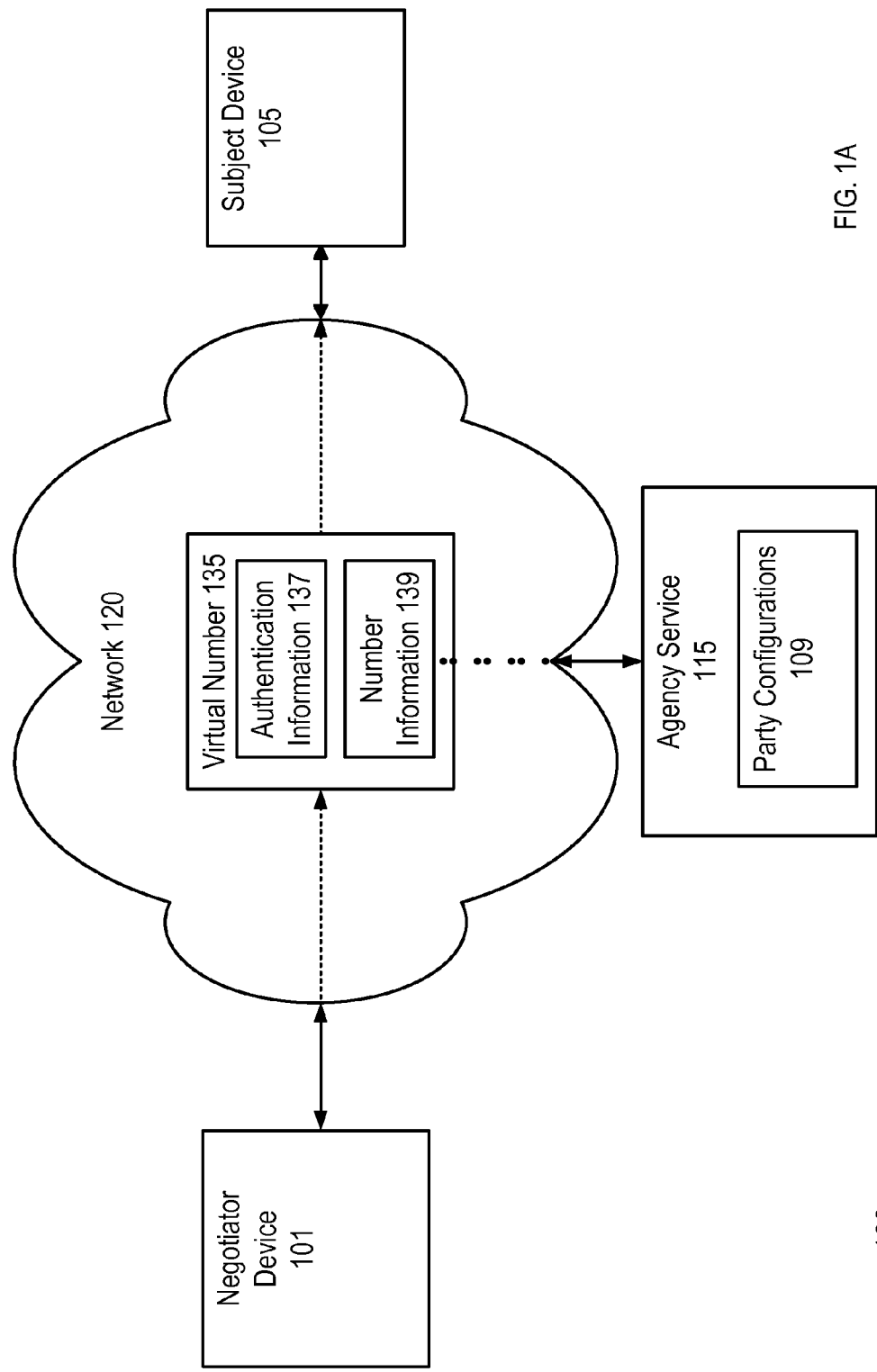
FIG. 1A is a diagram illustrating an environment for implementing a crisis negotiation system according to one example embodiment.

The Figures (FIG.) and the following description relate to preferred embodiments by way of illustration only. It should be noted that from the following discussion, alternative embodiments of the structures and methods disclosed herein will be readily recognized as viable alternatives that may be employed without departing from the principles of the embodiments.

Reference will now be made in detail to several embodiments, examples of which are illustrated in the accompanying figures. It is noted that wherever practicable, similar or like reference numbers may be used in the figures and may indicate similar or like functionality. The figures depict embodiments for purposes of illustration only.

Overview

A negotiator communicates with a subject by way of telephonic calls and messages through a virtual number. Additionally monitoring parties of individual members serving specialized functions are optionally dialed in (or permitted to dial in) to monitor call audio/receive the messages each time communications occur between the negotiator and the subject. Alternatively, a member of a particular monitoring party may dial in ahead of a call and be placed in a waiting room for the party until the call happens.

Different parties may have different functions. The negotiator communicates with the subject, and the subject with the negotiator through the virtual number. Additional monitoring parties may be configured in a variety of different ways to facilitate the function of the members in the party during a crisis negotiation. For example, one monitoring party may be configured such that members can communicate amongst themselves while additionally receiving communications between the negotiator and the subject. Another monitoring party may be configured such that communication amongst the members is disabled and each member only receives communications between the negotiator and the subject. Another monitoring party may be configured such that communication amongst the members is disabled and each member only receives communications from another monitoring party. Audio from the monitoring parties may not be transmitted to the subject and/or the negotiator so as not to interfere with the negotiations. However, in some instances, a monitoring party may be configured to transmit audio to the negotiator or negotiator and subject.

In establishing communications, the negotiator may spoof the number information presented to the subject device to show information corresponding to the device of a trusted source of the subject to increase the chances the subject will respond to the communication attempt. The trusted source's device and/or telephony system may be configured to ignore incoming calls from the subject device to automatically route incoming communication from the subject device through the virtual number to either the negotiator device or back to the trusted source's device to enable recording of the communications, participation in the communication by the negotiator, and/or monitoring of the communications by a monitoring party.

Example embodiments described herein relate to implementing a crisis negotiation system over a wired (e.g., PSTN and the Internet) and wireless radio network (e.g., PSTN, Cellular Network, and/or WiFi) for network capable devices, such as a mobile phone a land-line phone, VoIP phone, or computer, with a virtual number configured for crisis negotiation.

As mobile phones and similar devices are commonly carried by negotiators and other party members during the course of their duties, mobile phones offer an existing platform for managing crisis negotiations without dedicated equipment that may not be readily available at the scene. Additionally, with the popularity of smart phones and feature phones, additional monitoring features may be integrated into the negotiator and team member devices for enhancing operational viability in the field.

Conversations between the negotiator and subject using their respective devices may be recorded and all or a portion of the conversations distributed over existing channels (e.g., a network) back to the agency, agency service, party members or another entity. Embodiments of the agency, agency service and/or other entities within the crisis negotiation system receive the collected data for storage and/or live streaming to monitoring devices, negotiator devices, and records. Depending on the embodiment, the negotiator and monitoring devices are further configured to access and present (e.g., play and/or display) a variety of the conversation data stored on or streamed by the entities on the network. For example, the monitoring devices may access a web interface, API or execute a standalone application for viewing active crisis negotiation communications, such as retrieving audio data from crisis negotiations or viewing messages (e.g., SMS, MMS) and other textual communications, and viewing other information associated with crisis negotiations. In some embodiments, the monitoring devices may access portions of the real-time data via a provided monitoring line configured for maintaining the covertness of the crisis negotiation. Additionally, the crisis negotiation system may actively dial in monitoring devices to access real-time data such as call audio and forward messages and other textual communications to the monitoring devices. Furthermore, other agencies with appropriate credentials and monitoring devices may similarly access portions of the collected information during inter-agency responses.

Environment and Implementation of the Crisis Negotiation System

FIG. 1A is a block diagram illustrating an environment 100 for implementing a crisis negotiation system according to one example embodiment. As shown the environment 100 includes a network 120 connecting an agency support service provider "agency service" 115, a negotiator device 101 and subject device 105. While only one agency service 115 and one negotiator device 101 are shown in FIG. 1A for clarity, embodiments can support many negotiator devices 101 and have multiple agency service providers 115 for administrating multiple crisis negotiations among many subjects 105.

Agency service 115 represents a collection of compute devices (e.g., servers) and related storage mediums that are configured for performing various activities such as configuring virtual numbers 135, negotiator devices 101, exchanging data over the network 120 and storing data in support of one or more agencies (not shown) and operated negotiator devices 101. For example, the agency service 115 may include one or more modules providing ascribed functionality to an agency via an application programming interface ("API") or web interface, collectively "the interface", as described in more detail with reference to FIG. 1C. The agency service 115 may also include infrastructure for providing audio and video communicability (e.g., internally and/or over the network 120) within the monitoring interface using the public switched telephone network ("PSTN"), voice over internet protocol ("VoIP") and video conferencing services.

The negotiator devices 101 are oftentimes mobile telephonic devices capable of collecting data and transmitting data (e.g., wirelessly) over the network 120. Some examples of a negotiator device 101 include a mobile phone, tablet or notebook computer. Example embodiments of the negotiator device 101 as a mobile phone include feature phones, smart phones or standard mobile phones. Accordingly, a given mobile phone or other device operated as a negotiator device 101 may not necessarily include or support all of the functionality ascribed herein to the negotiator device or crisis negotiation system due to inherent differences in device capabilities. In some embodiments, other telephonic devices such as land-line phones are used with the crisis negotiation system.

In one embodiment, the negotiator device 101 executes a CN module for automating the setup of crisis negotiation connections through the network 120 and collecting and transmitting data to entities on the network 120. An example embodiment of a CN module is described in more detail with reference to FIG. 2. Features of the CN module may also be included at the agency service 115 and accessed from an interface.

In addition to the negotiator device 101, a number of monitoring devices (not shown) may connect to entities on the network 120 to obtain or present data associated with one or more ongoing crisis negotiations involving a negotiator device. Depending on the embodiment, a monitoring device is a network 120 capable device that can be operated within an agency or externally in the field. As referred to herein, a monitoring device is a mobile or stationary device capable of connectivity (e.g., wireless or wired) to a network 120 such as an agency network, the internet, PSTN and/or cellular network. Some examples of a monitoring device include a mobile phone, land-line phone, tablet and notebook or desktop computer.

Example embodiments of the monitoring device as a mobile phone can include feature phones, smart phones or standard mobile phones. Accordingly, a given mobile phone or other device operated as a monitoring device does not necessarily include or support all of the functionality ascribed herein to the monitoring device or the crisis negotiation system due to inherent differences in device capabilities. In one example embodiment, the monitoring device executes a monitoring module for interfacing with entities on the network 120 to monitor communications between the negotiator device 101 and subject device 105 and view collected data.

Also shown is a subject device 105 associated with the subject the negotiator desires to communicate with. Embodiments of the various subject devices 105 include any network 120 capable device that may send or receive information associated with a transmitting number on the network 120 (however, in some instances, the subject device 105 may use a virtual number itself, or other means, to do so). Accordingly, as referred to herein, a subject device 105 can be a mobile or stationary device capable of connectivity (e.g., wireless or wired) to the network 120 for sending or receiving information over the internet, PSTN and/or cellular network. Some examples of a subject device 105 include a mobile phone, land-line phone, tablet and notebook or desktop computer capable of receiving an incoming call.

FIG. 1A also illustrates a virtual number 135 configured for use on the network 120. In one embodiment, the agency service 115 and/or negotiator device 101 provisions and configures the virtual number 135 and handles number information to establish an identity for the virtual number on the network 120. Additionally, the agency service 115 receives authentication information 137 from the negotiator device 101, subject device 105 and any monitoring device connecting to the virtual numbers 135 for administrating crisis negotiations. Some examples of authentication information 137 include a transmitting number of a subject device 105, an authorized negotiator device 101 or monitoring device and/or a PIN number associated with the virtual number 135. For example, an negotiator device 101 may request (and attempt) to communicate through the virtual number 135 by way of a connection request or otherwise transmitting data to the virtual number such as by placing a call to the virtual number from the negotiator device. Based on the authentication information 137 received from the negotiator device 101, and configuration of the virtual number, the agency service 115 authenticates the negotiator device 101 for using the virtual number during a crisis negotiation. Monitoring devices connecting to the virtual number 135 to monitor communications between the negotiator device 101 and subject device 105 may be identified in a similar fashion. The agency service 115 may maintain party configurations 109 including a mapping table storing authentication numbers such as negotiator, subject and monitoring devices transmitting numbers and/or PINs in association with virtual number 135. The agency service 115 accesses the mapping table for authenticating the devices requesting to communicate through a virtual number based on received authentication information 137 and configure their communication abilities according to which party they belong.

After authenticating the negotiator device 101, the agency service 115 enables the negotiator to specify a subject 105 to initiate communications in the crisis negotiation with, using the negotiator device. Alternatively, the agency service 115 may configure the virtual number 135 such that a pre-specified subject device 105 automatically receives communications through the virtual number when the negotiator device 101 communicates with the virtual number.

In the case of audio communications, once the negotiator device 101 is connected to the virtual number 135, the agency service 115 enables the negotiator to specify the subject device 105 with which to communicate with during the crisis negotiation or identifies the subject device in the mapping table. In turn, the virtual number 135 is utilized to dial out to the subject device 105, which appears as a regular call from a device having specified number information 139 for the virtual number. Thus, for example, the number information 139 may be configured to spoof an identity of the virtual number such as to match that of a device belonging to a relative or relation of the subject. In other words, when the negotiator device 101 connects to the virtual number 135, the agency service 115 transmits instructions (e.g., to a provider) to dial out to the subject device 105 using the number information 139 specified for the virtual number 135 to connect the negotiator device 101 and the subject device 105. In turn, a number of monitoring devices may also be dialed in (or dial in to the virtual number 135) to listen to call audio between the negotiator and the subject. Optionally, users of the monitoring devices may communicate with each other with outbound audio to the negotiator and subject disabled.

The subject device 105 may also initiate communications with the negotiator device 101 through the virtual number 135. In such cases, devices dialing the virtual number 135 and not identified as either a negotiator device 101 or monitoring device 107 may be automatically connected as a subject device 105. Alternatively, the negotiator device 101 and/or agency service 115 may specify mapping information for the subject device 105 if device information is known (e.g., if the subject device 105 is provided to the subject or otherwise known).

In one embodiment, the agency service 115 stores party configurations for the virtual number 135. The party configuration information identifies the various monitoring devices 107 connecting to the virtual number 135 based on supplied authentication information 137 and identifies any monitoring devices 107 that that should automatically receive (or be notified of new) communications between the negotiator and the subject. Example party configurations are explained in greater detail with reference to FIG. 1B.

The network 120 represents the communication pathway between agencies, agency service 115, the negotiator devices 101, subject devices 105, monitoring devices and other entities (not shown). In one embodiment, the network 120 includes standard communications technologies and/or protocols and can include the Internet and PSTN. Oftentimes, these communications technologies and/or protocols carry both PSTN and Internet related data. Thus, the network 120 can include links using technologies such as Ethernet, 802.11, worldwide interoperability for microwave access (WiMAX), 2G/3G/4G mobile communications protocols, worldwide interoperability for PSTN communications, digital subscriber line (DSL), asynchronous transfer mode (ATM), InfiniBand, PCI Express Advanced Switching, etc. Similarly, the networking protocols used on the network 120 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 120 can be represented using technologies and/or formats including analog audio (e.g., for last mile PSTN communications), digital audio and video (e.g., as a file or streaming with Real Time Streaming Protocol), the hypertext markup language (HTML), the extensible markup language (XML), JavaScript, VBScript, FLASH, the portable document format (PDF), etc. In addition, all or some of the data exchanged over the network 120 can be encrypted using conventional encryption technologies such as secure sockets layer (SSL), transport layer security (TLS), virtual private networks (VPNs), Internet Protocol security (IPsec), etc. In another embodiment, the entities on the network 120 can use custom and/or dedicated data communications technologies instead of, or in addition to, the ones described above. For example, some government agencies and the military may operate networks auxiliary to the internet and PSTN.

Figure 1B:
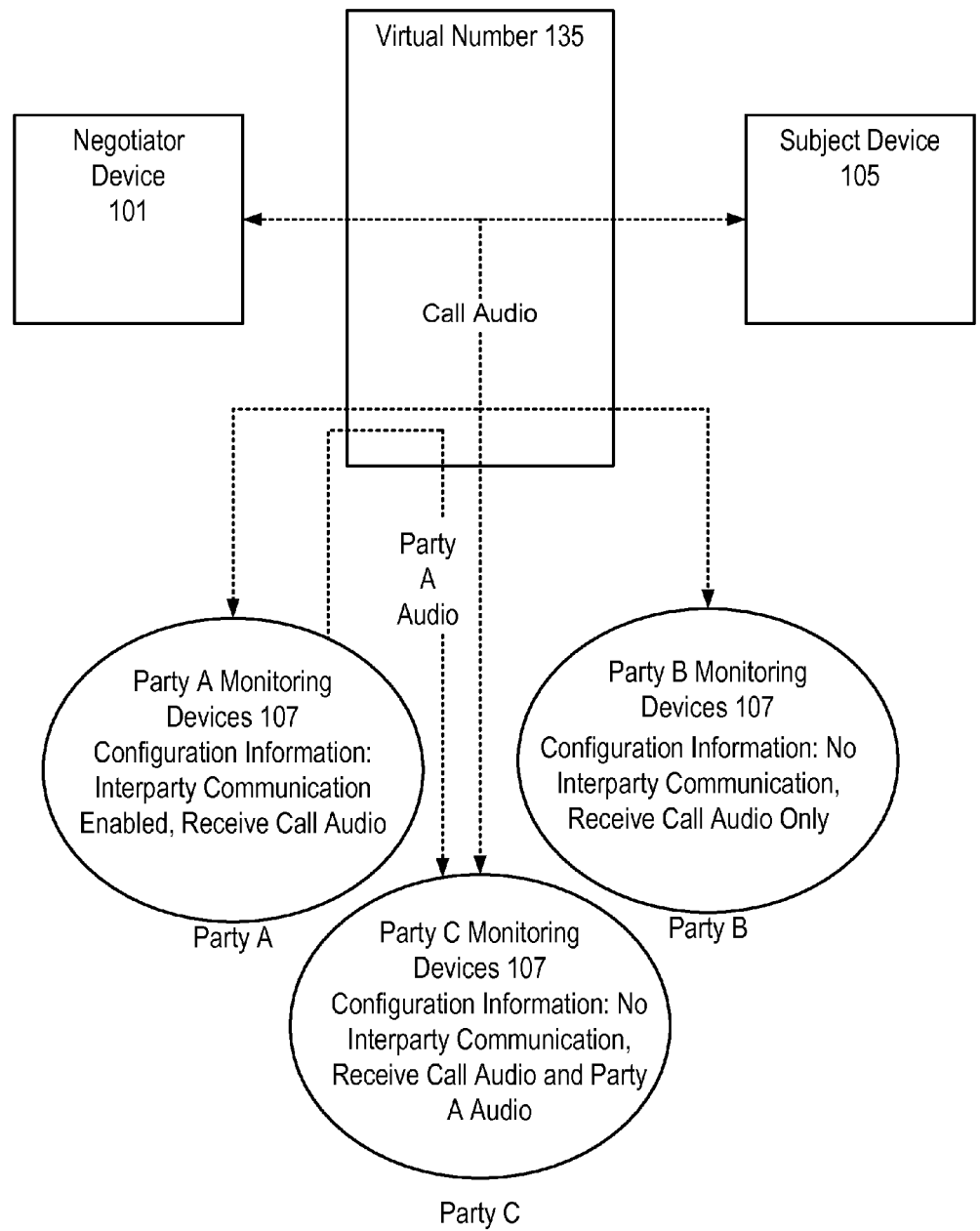
FIG. 1B is a diagram illustrating a party configuration for a crisis negotiation system according to one example embodiment.

FIG. 1B is a diagram illustrating a party configuration 200 for a crisis negotiation system according to one example embodiment. The party configurations may be stored at the agency service. As shown, the negotiator device 101 communicates with the subject device 105 via the virtual number 135. Call audio transmitted between the negotiator device 101 and the subject device 105 may be passed to a number of other parties. Three monitoring parties are illustrated in the example embodiment in addition to the negotiator and subject.

Party A may include a number of monitoring devices 107 connected to the virtual number 135 and capable of receiving call audio. The monitoring devices 107 in Party A may be identified based on authentication information 137 received upon their dialing into the virtual number 135 and/or dialed in automatically based on transmitting numbers of the monitoring devices 107 stored in a mapping table (and optionally providing authentication information 137). In one embodiment, configuration information specified for Party A configures the connection of Party A monitoring devices 107 with the virtual number 135 such that they receive call audio between the negotiator device 101 and the subject device 105 in addition to audio from other monitoring devices 107 with the Party A. Accordingly, users of monitoring devices 107 belonging to Party A may communicate with each other, in addition to listening to call audio between the negotiator and the subject, without transmitting audio to either the negotiator and the subject.

Party B may also include a number of monitoring devices 107 connected to the virtual number 135 and capable of receiving call audio. In one embodiment, configuration information specified for Party B configures the connection of Party B monitoring devices 107 with the virtual number 135 such that they have interparty communications disabled and are only be able to receive call audio between the negotiator and the subject (e.g., all outgoing communications are disabled).

Party C includes include a number of monitoring devices 107 connected to the virtual number 137 and capable of receiving call audio including both that of the negotiator/subject and the another party, such as the depicted party A audio. In one embodiment, configuration information specified for Party C configures the connection of Party C monitoring devices 107 with the virtual number 135 such that they have interparty communications disabled, receive negotiator and subject call audio, and receive party A audio. In other embodiments (not shown), configuration information specified for Party C configures the connection of Party C monitoring devices 107 with the virtual number 135 such that they only receive audio from Party A. Thus, for example, if Party C members are part of an ingress team tasked with apprehending the subject, they may receive only instructions and/or updates from party A.

Example configuration options for a party may include:
1. interparty communications enabled/disabled.
2. receive audio between negotiator and subject enabled/disabled.
3. receive audio amongst members of another party enabled/disabled.
4. outbound communications to the negotiator and/or subject enabled/disabled, and if outbound communications are enabled, to which entity outbound communications should be directed (e.g., to the negotiator device).

The agency service 115 may store party configuration information including configuration information for connections of monitoring devices in a party with the virtual number, authentication information for monitoring device assigned to the party, and/or authentication information for a monitoring device to join the party in the form of a mapping table. The agency service 115 may receive the party configuration information, which may be provided by the negotiator device 101 and/or monitoring device via an interface. In one embodiment, the interface may be accessed using a CN module and/or monitoring module executing on a device or online website. Thus, for example, the negotiator and/or monitors may enter the names and device information for each potential user of the system and assign the user (or device of the user) to a specific party in the mapping table. Users may be added or moved to different parties on the fly. Additionally, a member of a given party (such as a secondary negotiator) may be swapped with the current negotiator or otherwise be enabled to communicate with the negotiator device 101 (solely) or both the negotiator and subject in real-time utilizing the interface or CN/monitoring module.

Alternatively, a user may dial into the virtual number being used to communicate with the suspect or a separate monitoring number (which call audio is transmitted to, in a similar fashion to a monitoring device) and enter a party-specific PIN to "join" the corresponding party.

Alternative configurations may enable a user to text the virtual number 135 or the separate monitoring number with a pin to join or leave a party, or visit a mobile website and enter their PIN and either stream audio online or be dialed into the virtual number. A user may join a party until later removed, or their membership may be set to expire after a time period, such as 12 hours when the user's shift is over, in which case a replacement party member may be automatically dialed in. These additional options may be also specified in the party configuration information stored in a mapping table.

In addition to call audio, party members may receive textual and image communications between the negotiator device 101 and the subject device 105. For example, the negotiator device 101 may transmit data such as a short message service (SMS) message to the virtual number 135 and specify the subject device 105 as the recipient for receiving the SMS message from the virtual number 135. In other words, the agency service 115 may transmit instructions (e.g., to a provider) to either dial out to the subject device 105 from the virtual number 135 to connect the negotiator device 101 with the subject device 105 or to send an SMS message from the virtual number to transmit data received from the negotiator device 101 to the subject. In instances where device information for the subject is known and stored in the mapping table at the agency service, the negotiator device (identified by its transmitting number) may simply text the virtual number 135. Similarly, text messaged received at the virtual number from the subject device 105 (identified by its transmitting number) may be transmitted to the negotiator device 101. In instances where device information of the subject device 105 is not known (e.g., if a bull horn is being used to instruct the subject to contact the virtual number), all text messages received at the virtual number 135 may be passed to the negotiator until device information for the subject is ascertained and stored in the mapping table. Text messages received at the virtual number 135 may be identified as originating from either the subject or negotiator and transmitted to the desired monitoring devices (e.g., based on party affiliation) specified in the mapping table.

As used herein, the term "module" refers to computer program instructions and/or other logic used to provide the specified functionality. Thus, a module can be implemented in hardware, firmware, and/or software. In one embodiment, program modules formed of executable computer program instructions are stored on a non-transitory storage device, loaded into memory, and executed by a computer processor as one or more processes.

As used herein, the terms "message," "messaging," and "short messaging service (SMS) message" each comprise the breadth of messaging services and related technologies or standards used for communicating and transmitting data over the network 120. These technologies and services include SMS messages, multimedia messaging service "MMS" messages, proprietary messaging service messages such as BLACKBERRY messages "BBM" and the like.

Figure 1C:
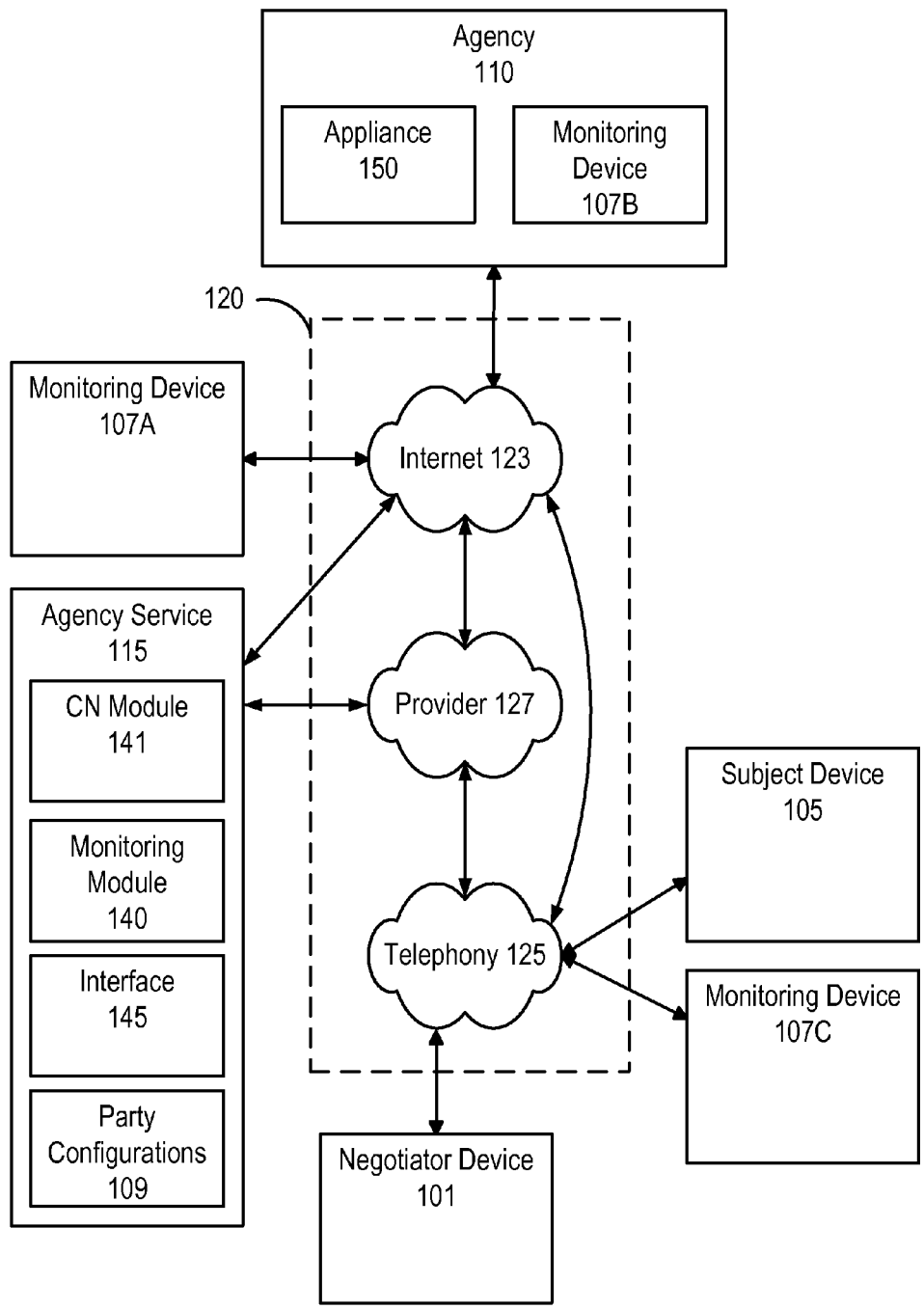
FIG. 1C is a block diagram illustrating an operating environment of an agency service providing a crisis negotiation service according to one example embodiment.

FIG. 1C is a block diagram illustrating an operating environment of an agency service 115 providing a crisis negotiation system according to one example embodiment. As shown, the operating environment includes an agency 110, monitoring devices 107, negotiator device 101, subject 105 and a network 120 with components such as the internet 123, telephony 125 and provider 127. The network 120 may also include GPS satellites (not shown) that relay position data to the negotiator device 101 and other devices.

Agency 110 represents a collection of servers, desktop, notebook or tablet computers, mobile telephones and related storage mediums used by respective agency personnel for executing applications or modules to communicate with and receive data from the agency service 115 (e.g., via the interface 145) and other entities on the network 120. For example, agency 110 devices may execute a web browser to access a web interface or execute a mobile or desktop application for communicating with an API provided by the agency service 115. An agency 110 may also include telephonic and video infrastructure enabling audio and video communicability (e.g., internally and/or over the network 120) using the public switched telephone network ("PSTN"), voice over internet protocol ("VoIP") and video conferencing services for monitoring or specifying configurations for monitoring crisis negotiations via virtual numbers.

The telephony network 125 may include servers, switches and other hardware and software for implementing, among other protocols and technologies, worldwide interoperability for PSTN communications including land-lines and 2G/3G/4G wireless protocols. The telephony network 125 also provides mobile devices with the capability to transmit and receive data over the internet 123. The telephony network 125 is managed by one or more communication service providers "CSPs" (not shown) that own telephone numbers for use on the PSTN and the CSPs own network (e.g., a wireless network that communicates with the PSTN).

The provider 127 may include servers, switches and other hardware and software for communicating over the network 120 with CSPs and other entities. The provider 127 buys or leases numbers for use on the telephony network 125 from multiple CSPs. The provider 127, in turn, manages numbers provisioned for use by the agency service 115 and the telephony traffic associated with the numbers. In one embodiment, the provider 127 allows the agency service 115 to provision one or more of the numbers as virtual numbers over the network 120.

Typically, a number used on the telephony 125 network directs to a given mobile device, VoIP device or land-line device having an associated number identity characterized by automatic number identification "ANI" information, or caller identification. Virtual numbers, while still operable with the PSTN and CSP networks, are associated with the provider 127 who handles telephony traffic for the number. Because a virtual number does not direct to an end user device, the provider 127 may establish connections using the virtual number with devices dialing, dialed, or otherwise identified based on instructions or configuration information received from the agency service 115, agency 110, negotiator device 101, and/or monitoring device 107. Additionally, the provider 127 may record crisis negotiation information such as call audio, textual/image communications, and caller history (e.g., on a computer readable medium) and stream/provide the information for download (e.g., over the network 120).

The provider 127 may also pass/bridge audio (bidirectional or unidirectional) in real-time between two or more telephonic devices with virtual numbers (or connected by the provider 127 via a virtual number). For message communications, the provider 127 may forward the communication to an entity specified in the mapping table. Additionally, as the virtual numbers are handled by the provider 127, the agency service 115 may modify ANI information and caller identification associated with the virtual number. The provider 127 may also receive instructions to present a set of ANI information and caller identification information (e.g., a spoofed number identity) from one device (e.g., that of a trusted source of the subject) to another (e.g., that of the subject) when connecting devices (e.g., the negotiator device 101 to the subject device 105) via virtual numbers.

In addition to provisioning virtual numbers for the agency service 115, the provider 127 communicates notifications and data associated with the virtual numbers to the agency service 115 or other entity such as the agency 110. For example, the provider 127 may notify the agency service 115 (and optionally a monitoring device 107) when a negotiator device 101 and/or subject device 105 communicate through the virtual number in a crisis negotiation or upon completion of a communication in crisis negotiation. The provider 127 may notify the agency service 115 (and optionally a monitoring device 107) of an incoming call (e.g., the subject or negotiator) or message to the virtual number and receive instructions from the agency service 115 to establish a connection between the calling device and the virtual number and dial out or redirect the message to another device to establish communications between the subject and negotiator. The provider 127 may also receive instructions to stop/start recordings of communications in a crisis negotiation on the virtual number and interface with a transcription service to transcribe call audio. In turn, the provider 127 can transmit the recordings and transcripts to the agency service 115 or other entity on the network 120.

Additionally, the provider 127 may provide options to enable or disable inbound and/or outbound audio for monitoring devices in different parties connected to a virtual number and recordings thereof responsive to instructions received (e.g., via an API) from the agency service 115, monitoring device 107 or negotiator device 101. The provider 127 may receive instructions for storing party configurations 109 and managing a virtual number 135 as part of the provisioning process, prior to an incoming call, in real-time when connecting devices through the virtual number and during crisis negotiations. In some embodiments, the provider 127 communicates directly with the agency 110, operating device 101 and/or monitoring device 107 to provision virtual numbers, transmit notifications and data or receive instructions. Additionally, the provider 127 itself may function as a CSP and vice versa.

The agency service 115 receives requests for provisioning and mapping virtual number from the agency 110, negotiator device 101, or monitoring device 107 and stores the party configurations 109. The requests can include number information for provisioning virtual numbers such as an area code (e.g., 555), country code (e.g., +44) and/or associated CSP. In turn, the agency service 115 queries the provider 127 for available virtual numbers matching the request and returns the matching virtual numbers to the requesting entity. The agency service 115 subsequently receives a selection of virtual numbers from the requesting entity and claims the virtual numbers from the provider 127. The agency service 115 may optionally allow the entity to specify number information such as ANI and/or caller identification associated with the virtual number to spoof the number's identity on the network 120. The agency service 115, in turn, transmits instructions to the provider 127 for modifying the number identity. The agency service 115 may optionally verify the spoofed number identity. When a virtual number is no longer needed by the agency 110, the agency service 115 releases the number back to the provider 127.

The requests can also include mapping information for configuring claimed virtual number function in a mapping table, along with identifying party members of the different parties. Depending on the desired configuration, the mapping information may include the transmitting number and/or a PIN for authenticating negotiator devices 101 requesting to administrate a crisis negotiation, monitoring devices 107 for monitoring communications on the virtual number, and the transmitting number of the subject device 105. One example mapping request may specify a claimed virtual number for use as a crisis negotiation (CN) number that negotiator devices 101 connects to in order to engage in a crisis negotiation over the telephony 125 network with a subject device 105. In one embodiment, the request includes the transmitting numbers of negotiator device 101 allowed to use the virtual number for communicating with the subject and known device information for the subject. The request may alternatively or in addition include a PIN that the negotiator may enter on any device connecting to the virtual number to authenticate the device as a negotiator device 101. Entering of the negotiator PIN may automatically configure that device as the primary negotiator device 101. In response to the request, the agency service 115 associates the transmitting numbers or PIN with the virtual number and stores the association in a mapping table. Different PINs and configurations for respective parties may also be stored and the PINs entered by the various monitoring devices 107 to join the respective parties.

In practice, agency service 115 may consult the mapping table to automatically identify a device attempting to communicate through the virtual number as the negotiator device 101, monitoring device 107, or subject device 105 based on the device's transmitting number. Thus, for example, a negotiator using a negotiator device 101 may simply dial the CN number mapped to the transmitting number of his phone to automatically attempt to establish communications with the subject device. Similarly, when the subject device 105 communicates with the virtual number 135, the communications are automatically routed to the negotiator device 101.

Monitoring devices 107 may be identified in a similar fashion by their transmitting numbers to monitor communication from their assigned party. Alternatively, monitoring devices 107 may be required to enter a PIN corresponding to a party (e.g., in addition to or instead of transmitting number authentication) to join the party and monitor the communications. For example, in some embodiments, personnel with a monitoring device 107 may be enabled to listen in on the crisis negotiation in real-time with a mobile or land-line phone at the agency 110 or in the field by having the transmitting number of their devices or a separate PIN associated with the CN number in the mapping table. Additionally the monitoring device 107 may be connected based on the stored party configuration 109 information for assisting in the crisis negotiation based on the user's role. Accordingly, the monitoring device 107 may be authenticated based on its transmitting number and/or an entered PIN and receive crisis negotiation audio via the CN number from the subject and negotiator and/or from another party.

Additionally, embodiments of the agency service 115 can use the mapping of monitoring devices 107 for instructing the provider 127 to automatically dial (e.g., from a specified virtual number) or otherwise notify (e.g., a SMS text message or email) monitoring devices of communications on a given CN number. The agency service 115 may also notify monitoring devices 107 through the interface 145 or via email.

To prohibit unauthorized access to CN numbers, the agency service 115 may allow negotiators and other personnel such as party members to specify key-ins for authorizing devices when provisioning and/or mapping virtual numbers. The agency service 115 stores the key-ins in the mapping table or other suitable database structure to identify and authenticate devices attempting connections to the virtual numbers responsive to correct key-ins. Depending on the embodiment, the agency 110, agency service 115 or provider 127 may store the mapping table and/or key-ins for device identification and authentication.

In some embodiments, the agency service 115 queries one or more third party databases for the Caller ID information corresponding to the subject 105. The agency service 115 may use the Caller ID information to verify the validity of subject device information provided by the negotiator device 101 and/or for instructing the provider 127 to use a given virtual number 135 with the specified number information 139 (e.g., that of a relation to the subject) for dialing out to a subject.

In some embodiments, the agency service 115 provides a crisis negotiation (CN) module 141 to the negotiator device 101 or monitoring device 107. The CN module 141, when executed, interfaces with the agency service 115 to specify and modify party configurations 109, provision and modify number information of virtual numbers for crisis negotiations, and specify device information for the subject device 105. The CN module 141 is described in more detail with reference to FIG. 2.

In some embodiments, the agency service 115 includes an interface 145 for providing data received from negotiator device 101 and crisis negotiation communications between the subject device 105 and negotiator device 101 to various monitoring devices 107 and/or appliances 150 over the network 120. For example, the interface 145 may provide monitoring devices 107 and the appliance 150 with data corresponding to the status of one or more CN numbers (e.g., in use, complete, call history, etc.) and subject device 105 information. If a CN number is in use and the negotiator and subject are communicating real-time, the interface 145 may stream data such as audio and text/image communications through the virtual number received from the provider 127. In some embodiments, the interface 145 syncs collected data prior to transmission or includes tags in the transmitted data for synchronization of playback at the monitoring device 107 or negotiator device 101. The interface 145 can also stream, or provide for download, data from completed crisis negotiation recordings. In one embodiment, the interface 145 provides a timeline of the various communications during the crisis negotiation between the negotiator and subject, and optionally any recorded party communications. The timeline may indicate the timestamps (and duration) of communications which a user may select to view or play back a recording thereof.

In some embodiments, the agency service 115 provides a monitoring module 140 to monitoring devices 107 for accessing the interface 145. The monitoring module 140 transmits requests associated with configuring negotiator devices 101 and virtual numbers and receiving real-time and historic data for crisis negotiations. For example, the monitoring module 140 may provide a user interface or status dashboard with options for provisioning virtual numbers, mapping a transmitting number to a given virtual number and assigning PINs for authenticating connections to the virtual number. Additionally, the monitoring module 140 may provide a user interface for identifying a virtual number as a CN number in the mapping table. In one embodiment, the dashboard provides an option to toggle recording of a crisis negotiation on or off with the agency service 115. When the recording session is disabled, the monitoring device 107 still receives real-time data, but the agency service 115, appliance 150 and provider 127 do not store copies of the collected data.

The monitoring module 140 may also be used to access and playback historic activity associated with a given virtual number or negotiator device 101. For example, the monitoring module 140 may download files associated with a crisis negotiation for playback or stream them. In addition to interfacing with the agency service 115, the monitoring module 140 may interface with an appliance 150 that stores (or backs up) collected data within the agency 110. In some embodiments, the monitoring module 140 may include functionality of the CN module 141 and vice versa.

In one embodiment, the agency 110 includes an appliance 150 for storing data collected by negotiator devices 101 and crisis negotiation information and audio. The appliance 150 may utilize the monitoring interface 145 provided by the agency service 115 for updating stored data or receive data directly from negotiator devices 101. Additionally, the appliance 150 may receive audio recorded between the negotiator device 101 and subject device 105 and amongst different parties during the crisis negotiation and any associated transcripts of the audio from the provider 127 or agency service 115. One example embodiment of the appliance 150 also includes its own interface (not shown) that enables monitoring devices 107 and negotiator device 101 to access real-time and historic data stored on the appliance for administered crisis negotiations. Interfaces provided by the agency service 115 or appliance 150 may also be accessible via a web browser for streaming or downloading data and include the same or similar options.

Additionally, the appliance 150 and agency service 115 may communicate to intermittently update collected data and records at defined intervals or in response to notifications to download data. During the intervals or notification periods, the agency service 115 may process the data and perform any necessary actions as desired by negotiator devices 101 or monitoring device 107 until the data is transferred to the appliance 150. In some embodiments, the agency service 115 maintains a persistent connection with the appliance 150 to facilitate transfer of real-time data collected by negotiator devices 101 operated in the field.

In one embodiment, the agency service 115 ensures that it, and the provider 127, do not store data collected by negotiator devices 101 or from a virtual number beyond the time needed to facilitate transfer. However, in mission critical situations, negotiators and other agency 110 personnel cannot rely only on the availability of the appliance 150 for storing and maintaining collected data. Consequently, if the appliance 150 is unable to take possession of the collected data or goes offline during transfer, the agency service 115 and/or the provider 127 may maintain possession of the collected data until the appliance 150 is functioning. Furthermore, the agency service 115 and/or provider 127 may determine whether checksums, hashes or sizes of transferred data match the appliance's 150 version prior to deleting stored data.

In some embodiments, the agency service 115 maintains a database (not shown) storing hashes (e.g., MD5, SHA, etc.) that uniquely identify evidentiary files transmitted to the appliance 150. In the context of criminal investigations, the stored hash may serve to prove that recordings and other data on the appliance 150 have not been tampered with or compromised.

In some embodiments, the agency service 115 maintains an appliance instead of, or in addition to, the agency 110. In such cases, the appliance may exist as a dedicated piece of hardware or remote storage. Alternatively, embodiments of the appliance 150 may be implemented in a cloud computing and storage stack available on the network 120.

CN Module Functionality

Figure 2:
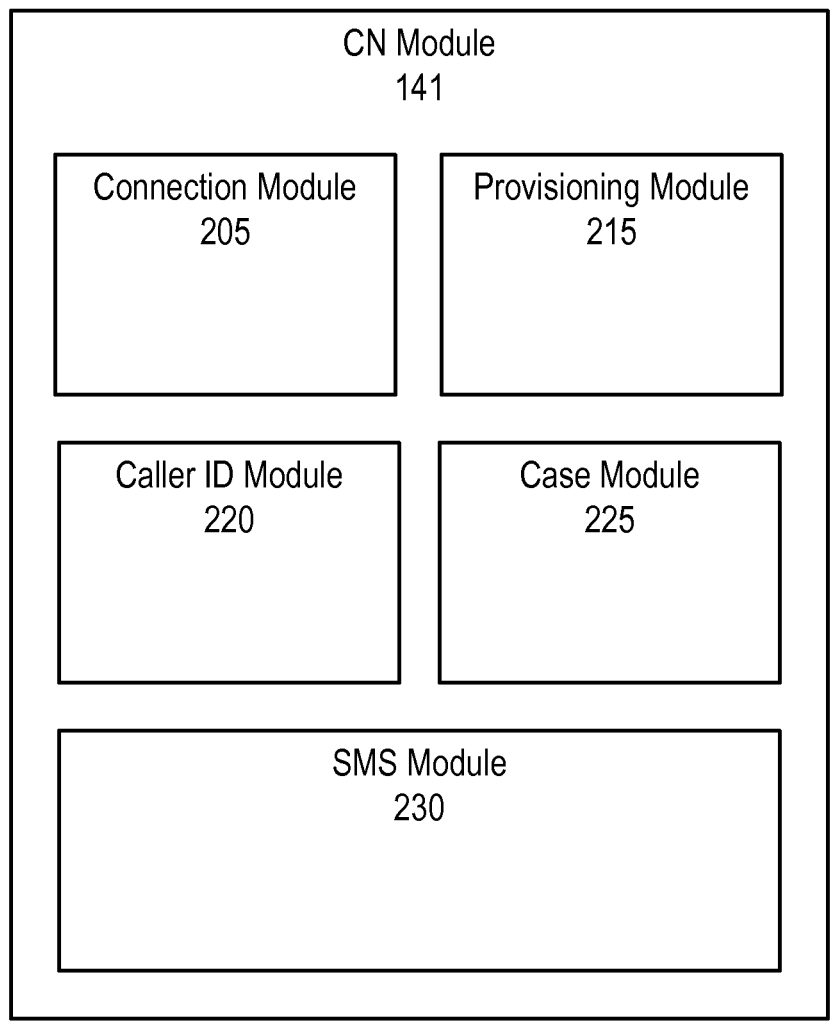
FIG. 2 is a block diagram illustrating a crisis negotiation (CN) module according to one example embodiment.

FIG. 2 is a block diagram illustrating a crisis negotiation module 141 according to one example embodiment. As mentioned above, the CN module 141 may be downloaded from the agency service 115 to the negotiator device 101. For example, the CN module 141 or its functionality may be incorporated in an application executable by the negotiator device 101. In turn, the negotiator device 101 may execute the CN module 141 (or application) to facilitate the crisis negotiation process and transmitting of collected data to entities on the network 120.

As shown in FIG. 2, the CN module 141 itself includes multiple modules. In the embodiment shown in FIG. 2, the CN module 141 includes a connection module 205, provisioning module 215, caller ID module 220, case module 225 and SMS module 230. In some embodiments, the functions are distributed among the modules in a different manner than described herein. Other embodiments have additional and/or other modules.

The connection module 205 automates the connection process for dialing out to a subject device. The connection module 205 receives input from the user including a CN number associated with the negotiator device 101. Once a connection with the CN number is established, the connection module 205 may transmit the number for a subject device 105 the negotiator desires to communicate with over the network 120. The connection module 205 may allow the negotiator to enter the number of the subject device 105 prior to, or after establishing the connection with the CN number. The connection module 205 may also allow the negotiator device 101 to specify any number information 139 for the virtual number. Additionally, the connection module 205 may interface with the agency service 115 to determine whether a subject device 105 has been associated with the CN number in the mapping table and present number information 139 for the virtual number 135, which may be modified by the negotiator device 101. In such cases, the authentication information 137 provided to the agency service 115 for the negotiator device 101 causes the agency service 115 to dial out to the subject device 105 based on the mapping table.

In one embodiment, the connection module 205 detects whether incoming calls were initially placed to a CN number. The connection module 205 subsequently determines the CN number and/or subject device 105 information for display to the user. For example, the connection module 205 may interface with the agency service 115 to determine information about incoming calls to the device from the CN number (e.g., for called placed to the CN number from the subject device 105) based on mapping table information.

Depending on the negotiator device's 101 capabilities, the communication module 205 may enable placement/receipt of multiple outgoing and incoming calls to virtual and non-virtual numbers within the native dialer application or similar.

The provisioning module 215 interfaces with the provider 127 or agency services 115 to provision virtual numbers and modify virtual number assignments and party configuration in the field. Alternatively, a web browser on the negotiator device 101 may be used. For example, the web browser or provisioning module 215 may present the negotiator with a list of all virtual numbers associated with a given account with the agency service 115. Through the interface, the negotiator may provision a virtual number, modify mapping information for the virtual number, and configure the virtual number as a CN numbers along with specifying the subject device 105 and monitoring devices 107 in the respective parties.

The provisioning module 215 may also be used to specify the configuration of each party. For example, the transmitting numbers of monitoring devices 107 may be specified for a given party. Alternatively, a PIN associated with the party may be specified such that when a monitoring device 107 is connected with the virtual number, entering a PIN causes the monitoring device 107 to be joined with the specified party.

Example configuration options that may be specified at the provisioning module 215 for each party may include whether:
1. interparty communications enabled/disabled.
2. receive audio between negotiator and subject enabled/disabled.
3. receive audio amongst members of another party enabled/disabled.
4. outbound communications to the negotiator and/or subject enabled/disabled, and if outbound communications are enabled, to which entity outbound communications should be directed (e.g., to the negotiator device).

The provisioning module 215 transmits the specified configurations options for each party to the agency service 115 for storage. The agency service 115 may additionally modify mapping table information for the CN number to associate one or more parties having the desired configurations with the CN number. The negotiator device 101 (or other entity such as an authorized monitoring device 107) may adjust the party configurations as necessary throughout the negotiation using the provisioning module 215 or through the interface 145 (e.g., utilizing a web browser).

Because the mapping and party configurations may be altered in real-time, the crisis negotiation system may be utilized by first responders to begin a crisis negotiation and later specify a dedicated or other negotiator device 101 (and additional monitoring devices 107) when additional personnel arrive at the scene or are otherwise needed.

The caller ID module 220 interfaces with the provider 127 or agency services 115 to modify caller ID or other number information associated with provisioned virtual numbers. For example, the caller ID module 220 presents an interface to the negotiator to specify number information such as location, ownership, carrier and whether or not any of the information should be restricted or blocked when dialing out (e.g., to the subject device 105) from a given CN number.

In some embodiments, the case module 225 interfaces with the provider 127, agency services 115 or appliance 150 to retrieve activities associated with a given CN number or case number which one or more crisis negotiations are associated with. For example, the case module 225 presents an interface with CN numbers or case numbers that the negotiator may select, for example, to view associated crisis negotiation activity. The case module 225 may further provide an interface for the negotiator to associate subject information with a given CN number or case number to automate connections and passage of messages through the virtual number between the negotiator device 101 and subject device 105.

Additionally, the case module 225 may retrieve activities associated with a given transmitting number of a negotiator device 101 used to administrate one or more crisis negotiations. For example, the case module 225 may transmit the transmitting number of the negotiator device 101 executing the case module 225 or other PIN information provided by the negotiator to the agency service 115 or appliance 150 to retrieve information about crisis negotiations administrated with the device or by the negotiator.

In some embodiments, the CN module 141 includes an SMS module 230 for sending SMS messages and receiving SMS messages through the CN number. The SMS module 230 may send and receive SMS messages natively (e.g., via the provider 127) and/or send and receive non-native messages (e.g., via the agency services 115) depending on the device capabilities. The SMS module 230 provides an interface to the user for selecting or otherwise specifying a CN number to use for sending an SMS message and the number of the subject device 105 that should receive the message. The SMS module 230 communicates (e.g., using the SMS itself or via the interface 145) the information for directing the SMS message to the subject device 105 to the agency service 115 and/or the provider 127. The SMS module 230 may further receive SMS messages sent to a CN number natively or via the interface 145. Additionally, the SMS module 230 may interface with the agency service 115 to determine whether a subject device 105 has been associated with the CN number in the mapping table and present number information for the virtual number 135 to the negotiator device 101. In such cases, the authentication information 137 provided to the agency service 115 for the negotiator device 101 causes the agency service 115 to transmit messages out to the subject device 105 from the CN number based on the mapping table. Similarly, messages received at the CN number may be identified as being transmitted from the subject device 105 and transmitted to the negotiator device 101 automatically based on the mapping table.

Additionally, some or all of the features provided by the CN module 141 may require the negotiator to enter a specified key-in (e.g., button press combination, password or other personal identification) prior to operation or launch. Further, all or some of the features of the monitoring module may be included in the CN module 141 and vice versa. In one embodiment, the CN module 141 includes features for establishing communications with the subject device 101 that are not included or otherwise disabled in the monitoring module.

Virtual Number Provisioning and Party Configuration

Figure 3A:
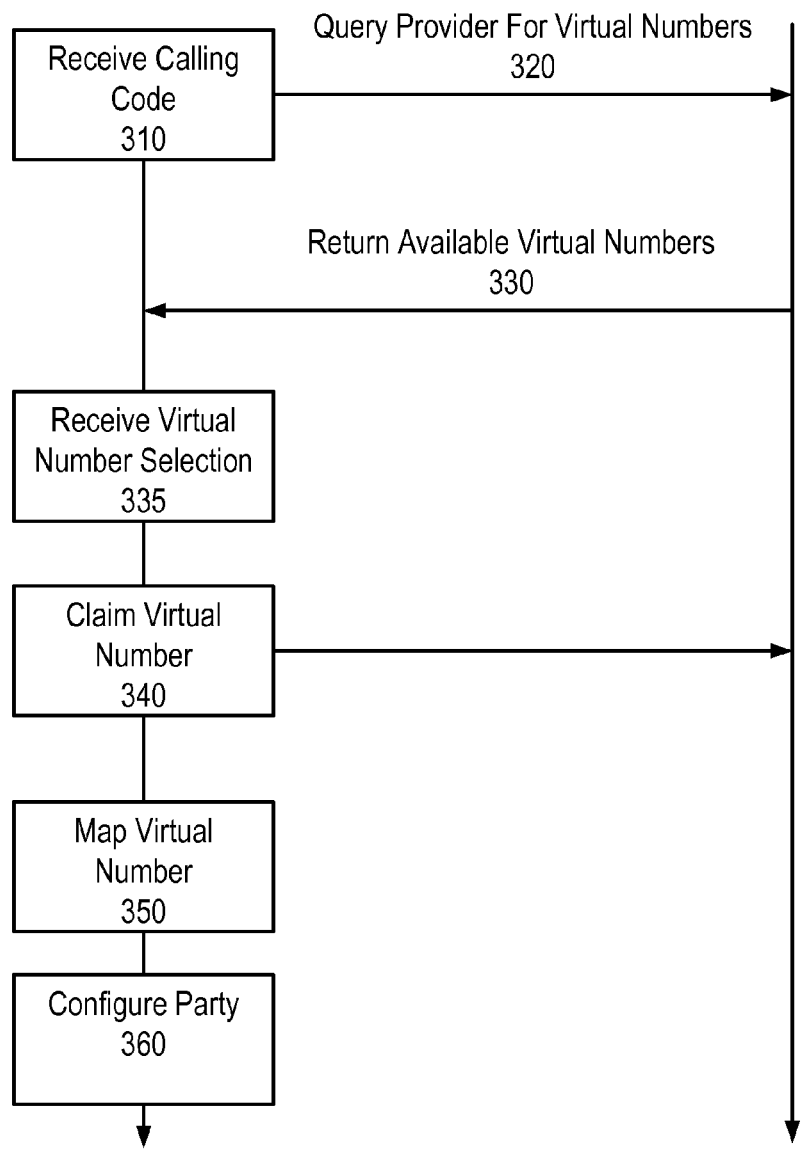
FIG. 3A is an interaction diagram illustrating a method for provisioning and mapping virtual numbers enabling a negotiator device to utilize a virtual number for crisis negotiations according to one example embodiment.

FIG. 3A is an interaction diagram illustrating a method for provisioning and mapping 300 virtual numbers enabling a negotiator device 101 to utilize a virtual number for crisis negotiations according to one example embodiment. Initially, the agency service 115 receives 310 a request including a calling code for provisioning 300 a virtual number from a monitoring device 107, negotiator device 101, provided web interface or other entity. The calling code can include an area code and country code where the provisioned virtual number will be operated.

The agency service 115 queries 320 the provider for virtual numbers matching the specified calling code. The provider 127 returns 330 a list of available virtual numbers to the agency service 115 which, in turn, transmits the virtual numbers for display to the requestor. The agency service 115 receives 335 one or more virtual number selections and claims 340 each selected virtual number from the provider 127. The agency service 115 may optionally include corresponding ANI and caller identification information for a virtual number that may be edited on the requesting device 101, 107 or in the web interface. The agency service 115 subsequently stores the modified virtual number information and instructs the provider 127 to update the associated virtual number information.

With one or more virtual numbers claimed, the agency service 115 can receive mapping requests for the virtual numbers and, in turn, map 350 the virtual numbers responsive to information in the mapping request. For example, the requestor may be prompted to enter the transmitting number of a negotiator device 101 and subject device 105 for association with a virtual number to be used as a CN number. The agency service 115 stores the transmitting numbers of the negotiator device 101 and subject device 105 and the CN number in a mapping table (e.g., at the agency service 115 or on the appliance 150). The requestor or other authorized entity may modify the mapping at any time, without any interruption of service at the receiving number. The requestor may also be prompted to enter a PIN for association with the virtual number to be used as a CN number. In such cases, the PIN number may be stored instead of, or in addition to, the transmitting number of a negotiator device 101 or otherwise used to identify when the negotiator device 101 connects to the CN number.

When a negotiator device 101 subsequently dials a CN number, the agency service 115 authenticates negotiator device responsive to the transmitting number associated with the CN number. The agency service 115 may further identify the negotiator device 101 from the mapping table responsive to a PIN provided by the negotiator. In turn, the agency service 115 instructs the provider 127 to connect the negotiator device 101 to the CN number and provides any additional configuration instructions for the CN number during the crisis negotiation process. A requestor may re-specify the mapping configuration as needed to change or swap transmitting numbers and PINs associated with CN numbers.

Example embodiments of monitoring device 107 mapping to virtual numbers for monitoring crisis negotiations may be performed in the same or similar fashion as negotiator device 101 mappings.

Additionally, when provisioning and mapping 300 the virtual number or after the virtual number is mapped, the agency service 115 may configure parties 360 for the CN number based on instructions from the negotiator device 101 or monitoring device 107 configuring or having authorized access to modify mapping information for the CN number. For example, a number of monitoring devices 107 may be associated with the CN number in the mapping table and each assigned to a given party associated with the CN number. Further, configuration options for the given party may be received and stored in the mapping table for accordingly configuring the connection of the monitoring devices 107 with the CN number that are identified as members of the given party. Thus, when a given monitoring device 107 dials into the CN number, the agency service 115 may automatically identify the given monitoring device 107 as an authorized device based on the transmitting number for monitoring communications on the CN number and identify the party to which the given monitoring device 107 is assigned. In turn, the agency service 115 configures the connection of the monitoring device 107 with the CN number based on configuration information stored in the mapping table for the assigned party.

Additionally, when either the negotiator device 101 or subject device 105 communicate using the CN number, the agency service 115 may automatically identify one or more monitoring devices 107 (e.g., identified in the mapping table based on party affiliation, all monitoring devices, or select monitoring device) associated with the CN number in the mapping table and instruct the provider 127 to dial out to the monitoring devices 107 to establish connections for monitoring audio communications between the negotiator and the subject. When a monitoring device 107 receives the dial in request (e.g., as an incoming connection request such as a telephonic call) and if the connection request is accepted, the monitoring device 107 is connected to the CN number based on configuration information stored in the mapping table for the assigned party. In the case of messages transmitted through the CN number, the messages may be forwarded to one or more of the monitoring devices 107 (e.g., identified in the mapping table based on party affiliation, all monitoring devices, or select monitoring device).

FIG. 3B is a table illustrating an example embodiment of virtual number mapping 350A with transmitting numbers 361A for providing a crisis negotiation service. As shown, mapping table 360A includes a CN number 363 mapped to authentication numbers 361A for authenticating devices requesting to connect to the CN number. As shown, the authentication number 361A according to the example embodiment is a transmitting number of a device (e.g., of a negotiator device, subject device, or monitoring device). Additionally, the mapping table includes a party 365 affiliation mapping for each authentication number 361A mapped to the CN number 363 for identifying the role of each device. Specifically, the party 365 information in the mapping table identifies whether a device with a transmitting number mapped to the CN number 363 is a negotiator device, subject device, or monitoring device. Further, the party 365 information for a monitoring device may identify a monitoring party (e.g., party A) to which the monitoring device belongs. The mapping table 360A may additionally include mapping information identifying the configuration options specified for a monitoring party to which a monitoring device is assigned. Alternatively, the agency service 115 may store the configuration options for each monitoring party separately.

From the mapping table 360A, when the agency service 115 receives connection requests to CN number 363 from the network 120, the agency service authenticates the requesting device based on the transmitting number of the requesting device matching an authenticated transmitting number 361A stored in association with the CN number. Additionally, from the mapping table 360A the requesting device may be identified as one of a negotiator device, subject device, or monitor device in a particular party based on the party 365 information mapped to the transmitting number.

In instances where no authenticated transmitting number 361A of a subject device is specified, the agency service 115 or provider 127 may receive number information for the subject device when the device requesting to connect to the CN number 363 is identified as the negotiator device 101. In turn, the agency service 115 instructs the provider to dial out using the provided number information for the subject device from the CN number 363. Additionally, in instances where no authenticated transmitting number 361A of a subject device is specified and a device requesting to connect to the CN number 363 cannot be identified as either a negotiator device or monitoring device, the requesting device may be identified as the subject device.

In some embodiments, prior to permitting the negotiator device 101 to communicate with a subject device in a crisis negotiation using the CN number or a monitoring device 107 to receive audio and join a monitoring party, the agency service 115 may wait for or instruct the provider 127 to wait for key-in of a specified PIN number stored in association with the authenticated transmitting number 361A of the monitoring device and/or negotiator device as an additional measure of security.

In some embodiments, more than one negotiator device may be mapped to a same CN number. Similarly, in some embodiments, more than one subject device may be mapped to a same CN number.

FIG. 3C is a table illustrating an example embodiment of virtual number mapping 350B with a PIN 361B for managing crisis negotiations. As shown, mapping table 360B includes a CN number 363 mapped to authentication PIN numbers 361B for authenticating devices requesting to connect to the CN number. PINs provide additional flexibility for authorizing a device requesting to connect to the CN number 363 by associating a unique PIN with a specific party 365. For example, the mapping table 360B may be used in conjunction with mapping table 360A to enable a device user to authenticate and identify their device as the negotiator device or monitoring device belonging to a particular monitoring party by entering the corresponding PIN (e.g., 12345 to authenticate as the negotiator, 54321 to authenticate as a monitor in monitoring party A, or 23532 to authenticate as a monitor in monitoring party B) when requesting to connect to the CN number 363. In some embodiments, entering a PIN on a given device may cause the agency service 115 to modify the mapping table 360A to enable future connection requests to the CN number 363 for that same device to proceed automatically based on the transmitting number of the device having entered the PIN.

In one embodiment, the negotiator or monitor must enter the PIN or key-in to enter a PIN (e.g., hitting * or # prior to entering the PIN) within a given time period (e.g., 2-5 seconds) to avoid being disconnected or identified as a subject device (if no subject device transmitting number is specified in mapping table 360A).

Administrating a Crisis Negotiation

FIG. 4 is an interaction diagram illustrating a method for connecting 400 a device with a CN number according to one example embodiment. Once the agency service 115 provisions 300 a virtual number with the provider 127 and the virtual number is configured as a CN number, a negotiator device 101, subject device 106, or monitoring device 107 may connect 400 to the CN number during a crisis negotiation.

For any device dialing 410 the CN number, the provider 127 receives the connection request via the telephony network 125 and identifies 420 the dialed CN number as a virtual number provisioned 300 by agency service 115. Accordingly, in embodiments where the agency service 115 stores the mapping table, the provider 127 passes authentication information such as the transmitting number of the device and the virtual number to the agency service 115.

The agency service 115, in turn, authenticates 430 the device attempting to connect to the CN number as a negotiator device 101, subject device 105, or monitoring device 107 based on agreement of the authentication information with the mapping of the transmitting number and the CN number stored in the mapping table. The agency service 115, in turn, instructs the provider 127 to connect 440 the negotiator device 101, subject device 105, or monitoring device 107 to the CN number and provides instructions for configuring the connection based on an identified party to which the device belongs. For example, the party to which the device belongs may be stored in association with the transmitting number of the device 101, 105, 107 and CN number in the mapping table to setup 500 the crisis negotiation connection. Example embodiments of setting up the crisis negotiation 500 are explained in more detail with reference to FIG. 5.

In some embodiments, a negotiator device 101 and/or monitoring device 107 may provide additional or different authentication information to the provider and/or agency service 115 such as a PIN for authenticating 430 party membership. The PIN may be stored in association with the CN number and a corresponding party in the mapping table. Thus, the user of the device may enter the PIN to identify with the corresponding party. For example, an agency 110 may want to enable the option to allow an unmapped negotiator device 101 and/or monitoring device 107 to utilize a CN number. If no transmitting number is identified in the mapping table for the device dialing 410 the CN number, the agency service 115 may instruct the provider 127 to wait for an authentication key-in of a PIN. Depending on the embodiment, the negotiator device 101 or monitoring device 107 may provide the PIN prior to, or subsequent to, the agency service 115 instructing the provider 127 to connect 440 the device.

If no PIN is entered, and no transmitting number is stored for a subject device in the mapping table in association with the CN number, the device dialing 410 the CN number may be identified as the subject device. If no authentication key-in of a PIN is provided, and a transmitting number is stored for a subject device in the mapping table in association with the CN number, the device dialing 410 the CN number may be disconnected.

In some embodiments, a separate virtual monitoring number may be established in addition to the CN number. For example, in a similar fashion as described with reference to FIGS. 1-3. The monitoring number may be associated with the CN number such that the agency service 115 instructs the provider 127 to bridge audio from the CN number to the monitoring number. In turn, the transmitting numbers of monitoring devices 107 and/or PINS and corresponding monitoring party (and any associated configuration options) mapped to the monitoring number and stored in the mapping table to avoid a large party of monitors calling the CN number and being incorrectly identified as the subject device during the crisis negotiations (e.g., if an authenticated transmitting number has not yet been stored for either a monitoring device or subject device).

By having a unique monitoring number, any monitor requesting to connect to the monitoring virtual number may enter a PIN (and a prompt may be played as the subject is not provided with the monitoring number) to join the respective party mapped to the PIN, or automatically connected if the transmitting number and monitoring party for the monitoring device are identified in the mapping table in a fashion similar to that for devices requesting to connect to the CN number. In some embodiments, the monitoring number or CN number may be a toll-free number, which by its nature unblocks and reveals the true number if any incoming caller, which aids in the ability to identify the device and hence the appropriate party.

Figure 5A:
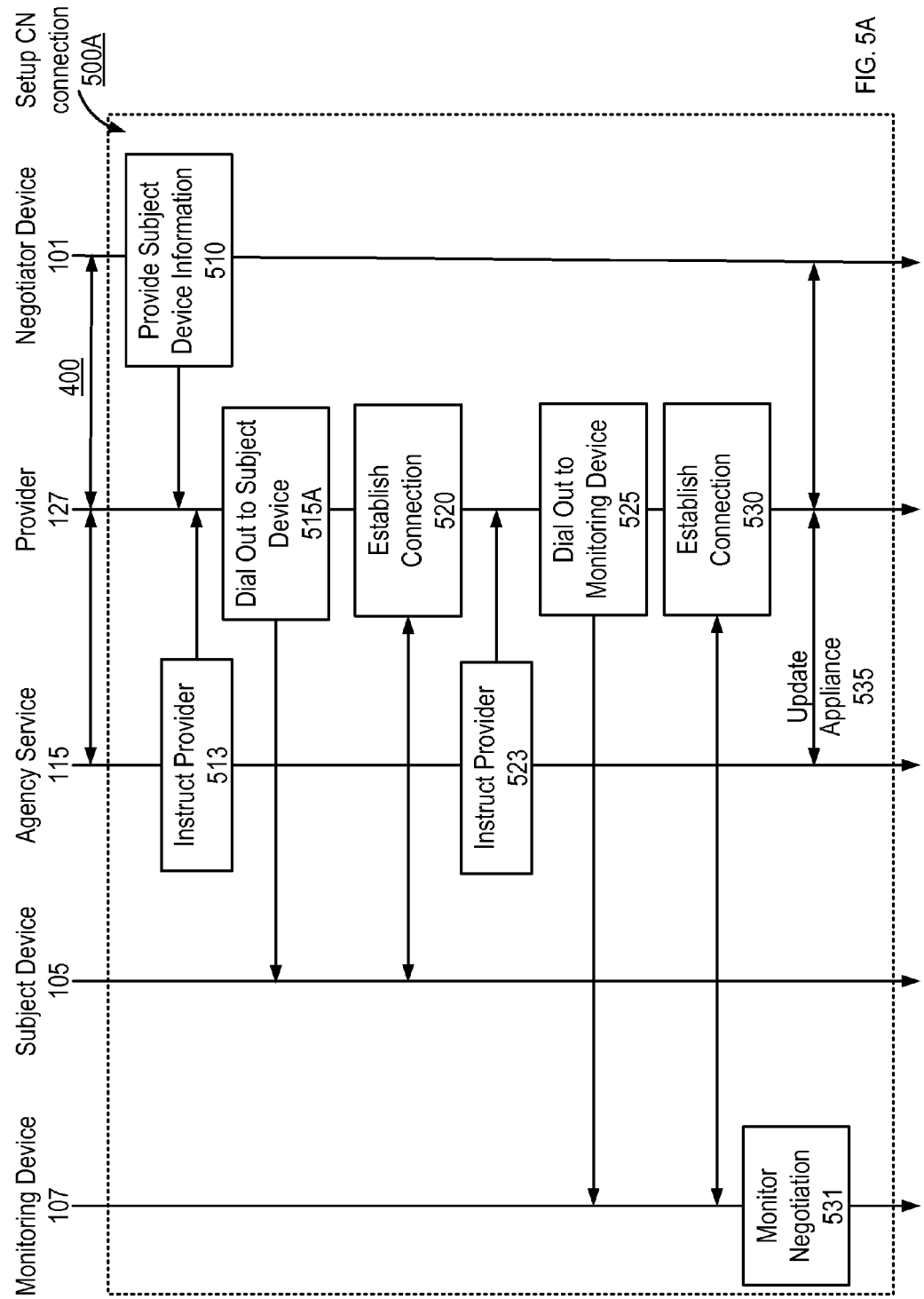
FIG. 5A and FIG. 5B are interaction diagrams illustrating example methods of setting up a connection in a crisis negotiation for establishing communications between a negotiator device and a subject device over a CN number.

FIG. 5A is an interaction diagram illustrating an example method of setting up connection 500A in a crisis negotiation for establishing communications between a negotiator device 101 and a subject device 105 over a CN number initiated by the negotiator device. With the negotiator device 101 authenticated and a connection 400 between the negotiator device 101 and the CN number established, the negotiator may provide 510 information for the subject device 105 such as the transmitting number of the subject device if a transmitting number of the subject device 105 cannot be identified in the mapping table. In one embodiment, the negotiator device 101 may be prompted to provide 510 the information for the subject or confirm device information for the subject device 105 identified from the mapping table that will be automatically dialed 515A. The provider 127 may transmit the subject device information receives from the negotiator device 101 to the agency service 115 or acknowledge receipt of the information for records keeping, verification thereof, or to open a new record. In some embodiments, the agency service 115 verifies whether the transmitting number of the subject device 105 is valid before instructing 513 the provider 127 to dial out 515A to the subject device 105.

In some embodiments, information 510 for more than one subject device 105 may be provided and/or identified in the mapping table. In such cases, the agency service 115 instructs 513 the provider 127 to dial out 515A to each subject device for establishing communications between the negotiator and the subjects. The communications may proceed when one or both of the subjects establishes a connection.

The agency service 115 instructs 513 the provider 127 to configure a connection through the CN number to establish communications between the negotiator device 101 and the subject device 105. For example, the instructions 513 in the case of an authenticated negotiator device 101 cause the provider 127 to dial out to the subject device 105 from the CN number based on the transmitting number either received in the subject device information 510 or identified for the subject device associated with the CN number in the mapping table. Thus, when the subject receives a connection request on the subject device, the request appears to originate from the CN number. Accordingly, the subject device 105 will display number information (if any, e.g., for blocked or restricted number) for the CN number rather than the negotiator device 101. In some embodiments, the instructions 513 may include number information for spoofing the number information of the CN number to mimic that of a relation of the subject. If the subject device 105 accepts the connection request, the provider 127 establishes 520 a connection between the negotiator device 101 and the subject device 105 (e.g., through the CN number).

The connection 520 between the negotiator device 101 and the subject device 105 is configured by the provider 127 based on the instructions 513 to enable audio communications between the two devices. The negotiator device 101 collects audio data via a microphone coupled to the negotiator device and transmits the collected audio data to the provider 127, which in turn transmits the audio to the subject device 105 by way of the connection 400 through the CN number. The subject device 105 communicates with the negotiator device 101 through the CN in a similar fashion. Thus, with bi-directional audio communication enabled between the subject device 105 and negotiator device 105, the negotiator and subject may communicate during a crisis.

The agency service 115 may additionally instruct 523 the provider to dial out to monitoring devices 107 with a transmitting number associated with the CN number in the mapping table. The monitoring devices 107 may either be dialed out 525 to from the CN number or a dedicated monitoring number to which audio from the CN number is bridged to for monitoring. The instructions 525 may also specify a configuration for establishing the connection 530 with a given monitoring device 107 for monitoring the negotiations 531. For example, the agency service 115 may provide instructions 523 for dialing out 525 to a given monitoring device based on the transmitting number of the monitoring device and monitoring party associated with the transmitting number in the mapping table. Thus, the instructions 523 may include the party configuration options specified (e.g., in the mapping table) for the monitoring party to which the monitoring device 107 is assigned. In turn, when the monitoring device 107 accepts the connection request to monitor the negotiations 531, the provider 127 establishes a connection 530 configured such that the monitoring device only receives audio from (e.g., the subject and negotiator and/or other monitoring devices in a same and/or different monitoring party) and transmits audio to (e.g., monitoring devices in the same and/or different monitoring party and/or another monitoring party) the appropriate devices.

In some embodiments, the negotiator device 101 and/or monitoring device 107 may transmit commands (e.g., via the CN or monitoring module) that specify actions the provider 127 and/or agency service 115 should take during the crisis negotiation. For example, the commands may cause the provider 127 to start or stop recording of audio and disconnect a device or modify connection configurations of a monitoring device, negotiator device, or monitoring party.

The provider 127 and/or the agency service 115 may update 535 the appliance 150 with recorded audio data during the crisis negotiation. The agency service 115 or provider 127 may also update 535 the appliance with any other data received from the provider 127 and/or negotiator device 101 and subject device 105 such as messages routed between the subject device 105 and the negotiator device 101 via the CN number according to the mapping table. These messages may also be forwarded to the monitoring devices 107 based on instructions from the agency service 115.

In one embodiment, after the crisis negotiation is completed, the agency service 115 may notify the negotiator device or monitoring device that the recorded audio is available from the agency service 115 or appliance 150. For example, the agency service 115 may transmit an e-mail to the negotiator device or instruct the provider 127 to transmit a text message to the transmitting number of the negotiator device 101 reading: "To listen to the crisis negotiation, visit URL [www.example.com/transmittingnumber] and enter PIN [random#]". Accordingly, by accessing the URL (e.g., provided by the interface 145) and entering the PIN the negotiator may playback the crisis negotiation and/or create an account for viewing the crisis negotiations they administrate.

Figure 5B:
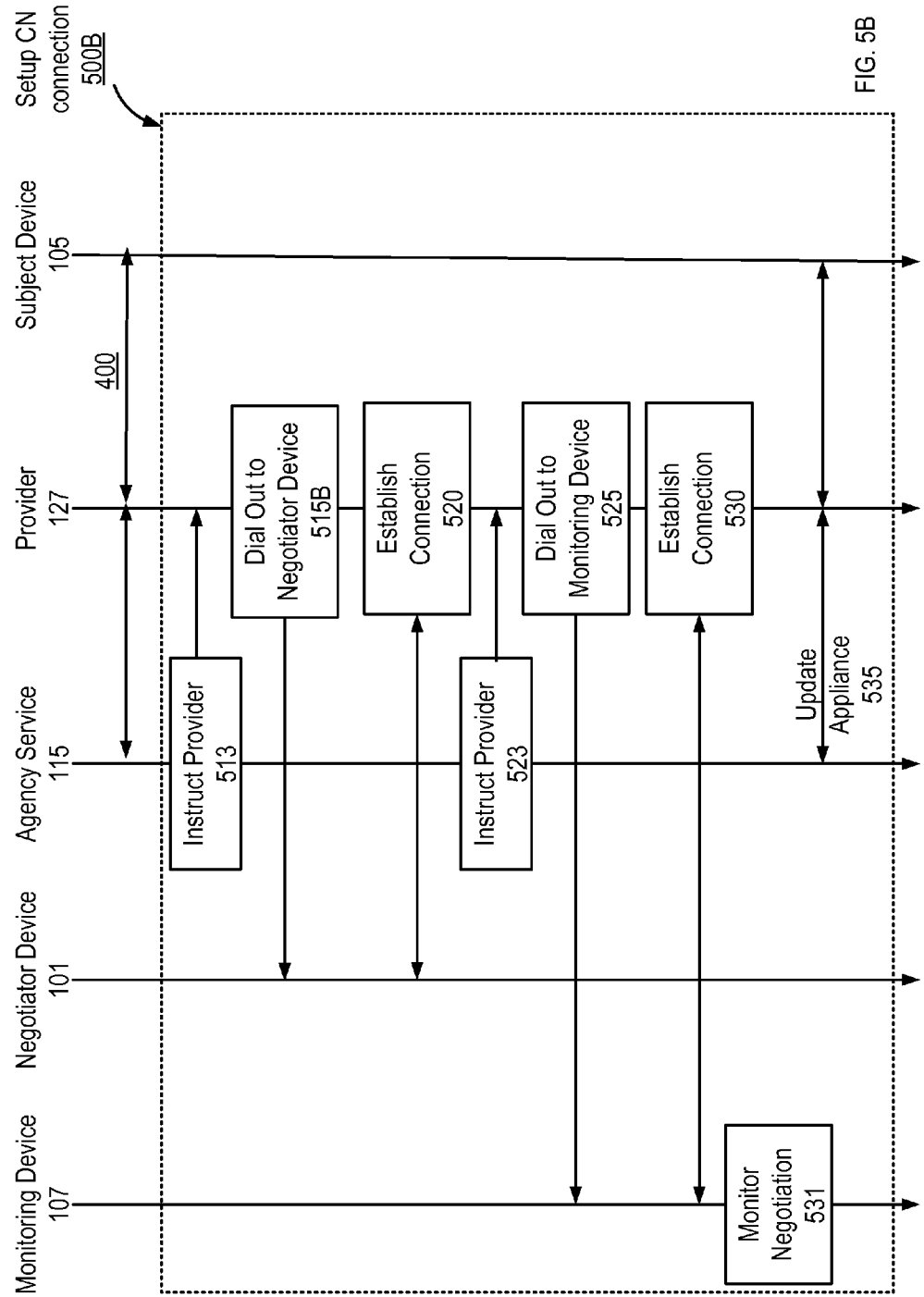

FIG. 5B is an interaction diagram illustrating an example method of setting up connection 500B in a crisis negotiation for establishing communications between a negotiator device 101 and a subject device 105 over a CN number initiated by the subject device. With the subject device 101 authenticated and a connection 400 between the subject device 105 and the CN number is established, the agency service 115 identifies the transmitting number of the negotiator device 101 associated with the CN number in the mapping table and instructs the provider 513 to dial out 515B to the negotiator device 101. In some embodiments, more than one negotiator device may be mapped to a same CN number. In such cases, the agency service 115 instructs 513 the provider 127 to dial out 515B to each negotiator device for establishing communications between the negotiators and the subject. The communications may proceed when one or both of the negotiators establishes a connection.

In some embodiments, the number information for the CN number may have been spoofed during a prior attempt to establish communications or in establishing communications between the negotiator device 101 and the subject device 105 (e.g., when initiated by the negotiator device 101 as described in FIG. 5A). Accordingly, the transmitting number identified to the subject device which the subject would dial to communicate with the negotiator differs from the CN number. For example, while the number information for the CN number may be spoofed to dial out to the subject device and appear as originating from the device of a relation, any return connection request initiated by the subject device would be directed to the device of the relation. In another example, the subject may only initiate attempts to communicate with a relation and ignore incoming connection requests once the subject realizes the negotiator may request connections with spoofed number information.

In order to route the connection request initiated to the relation or other spoofed transmitting number by the subject device 105 to the CN number, the agency service 115 or device associated with the spoofed number may transmit a call forwarding or conditional call forwarding command identifying the CN number to the provider 127 and instructing the provider 127 to configure the spoofed number such that connection requests from the subject device 105 to the spoofed number may be routed to the CN number and the subject device 105 identified as described with reference to FIG. 4. Incoming connection requests to the spoofed number may be routed in all cases (e.g., call forwarding) or selectively (e.g., conditional call forwarding). In conditional call forwarding, the device of the relation may receive a connection request from the subject device 105 and reject the connection request to route the connection request to the CN number.

In some embodiments, the agency service 115 and/or relation via their device may instruct the provider 127 to conditionally call-forward incoming calls on the relation's transmitting number to the CN number, and the agency service 115 subsequently instruct the provider 127 to route the connection request back to the device of the relation. In such instances, the agency service 115 identifies the subject device 105 requesting to connect to the CN number as described with reference to FIG. 4, the provider 127 routes the connection through the CN number and back to the relation's device, and operations for setting up the CN connection 500B are performed in response to the agency service 115 having connected the subject device through the CN number to establish connections with the negotiator device 101 and any monitoring devices 107.

If the negotiator device 101 accepts the connection request, the provider 127 establishes 520 a connection between the negotiator device 101 and the subject device 105 (e.g., through the CN number). The connection 520 between the negotiator device 101 and the subject device 105 is configured by the provider 127 based on the instructions 513 to enable audio communications between the two devices. The negotiator device 101 collects audio data via a microphone coupled to the negotiator device and transmits the collected audio data to the provider 127, which in turn transmits the audio to the subject device 105 by way of the connection 400 through the CN number. The subject device 105 communicates with the negotiator device 101 through the CN in a similar fashion. Thus, with bi-directional audio communication enabled between the subject device 105 and negotiator device 105, the negotiator and subject may communicate during a crisis.

The agency service 115 may additionally instruct 523 the provider to dial out to monitoring devices 107 with a transmitting number associated with the CN number in the mapping table in a fashion similar to that described with reference to FIG. 5A. Thus, for example, the monitoring devices 107 may either be dialed out 525 to from the CN number or a dedicated monitoring number to which audio from the CN number is bridged to for monitoring and the instructions 525 may also specify a configuration for establishing the connection 530 with a given monitoring device 107 for monitoring the negotiations 531. Other operations such as updating the appliance 535 may also be performed in a fashion similar to that described with reference to FIG. 5A.

Monitoring a Crisis Negotiation

FIG. 6 is an interaction diagram illustrating a method of monitoring 600 communications in crisis negotiation according to one example embodiment. As described above, the provider 127 may collect 610 audio and message communication data transmitted between the negotiator device 101 and subject device 105 though the CN number and transmit the collected 610 data to the agency service 115. In turn, the agency service 115 and/or provider 127 may update 530 the appliance at the agency 110. In some cases, it may be desirable for personnel other than the negotiator to monitor or listen in on the crisis negotiation in real-time or near real-time and access the data collected during a crisis negotiation. For example, a monitoring device 107 may monitor 600A, 600B the crisis negotiation according to one or both of the processes outlined below.

In one embodiment, a monitoring device 107 requests to connect 400 to a CN number directly for monitoring 600A the crisis negotiation, for example, as described with reference to FIG. 4. In some embodiments, a monitoring device 107 may request to connect to a dedicated monitoring number associated with the CN number in the mapping table. In either instance, instead of being authenticated by the agency service 115 as a negotiator device 101 or subject device, the device is authenticated as a monitoring device 107 (e.g., from the mapping table by a transmitting number of the device or a provided PIN) and the steps for setup of the CN connection 500 illustrated in FIGS. 5A and 5B may be simplified as neither the subject device 105 nor negotiator device 101 should be dialed. Alternatively, the monitoring device 107 may receive a connection request from the CN number (or dedicated monitoring number) when dialed in as described with reference to FIG. 5A or FIG. 5B. In both instances, the agency service 115 instructs 623 the provider for configuring 625 the connection of the monitoring device 107 with the CN number (or dedicated monitoring number).

For example, the agency service 115 transmits instructions 623 to the provider 127 based on the configuration options specified for a monitoring party identified for the monitoring device 107 from the mapping table. In turn, the provider 127 configures 625 the connection based on the instructions such that the monitoring device only receives audio from (e.g., the subject and negotiator and/or other monitoring devices in a same and/or different monitoring party) and transmits audio to (e.g., monitoring devices in the same and/or different monitoring party and/or another monitoring party) the appropriate devices as specified by the agency service 115. Thus, for example, the monitoring device 640 may receive live audio communications 640 associated with the crisis negotiation between the negotiator and the subject and/or other monitoring devices in a same or different monitoring party according to party assignment.

In some embodiments, the instructions 623 cause the provider 127 to configure 625 the connection with outgoing communication capabilities enabled such that, for example, the monitoring device 107 may participate in interparty communications. The instructions 623 may further cause the provider 127 to disable outgoing communication capabilities for the monitoring device 107 to prevent transmission of audio to devices such as the negotiator device, subject device, and one or more other monitoring devices in a same or different monitoring party. To continue monitoring 600A the crisis negotiation, the monitoring device 107 need only to maintain the configured 625 connection.

In another embodiment, the monitoring device 107 connects 650 to the agency service 115 and/or appliance 150 for monitoring 600B the crisis negotiation. The monitoring device 107 may establish the connection 650 using a web browser or monitoring module 140 that retrieves or streams collected data via a monitoring interface on the appliance 150 or agency service 115 (e.g., monitoring interface 145).

In one example embodiment, the monitoring device 107 streams 660 audio and/or messages in real-time from the agency service 115 that are communicated through the CN number. In some embodiments, the appliance 150 also supports real-time monitoring. In addition, the monitoring device 107 may retrieve 670 historical data stored on the appliance 150 to view previously administrated negotiation sessions 500. For example, when a crisis negotiation is complete, the session may be replayed on the monitoring device 107 or negotiator device 101 by connecting 650 to the appliance 150 or agency service 115 where the evidence/recorded data is stored. However, for example, if the recording was stopped at any point during the crisis negotiation, or the recording was canceled, a notification may accompany a timeline indicating the portions of that call that were not recorded.

In some instances, the monitoring device 107 receives notifications from the monitoring interface 145 for display in the web browser or with the monitoring module 140. Example notifications include audio or visual alerts for notifying personnel when the negotiator device 101 ends the crisis negotiation.

SUMMARY

The foregoing description of the embodiments has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A computer based method for establishing communications between a negotiator and a subject, the method comprising:

storing, in association with a virtual number in a mapping table, an authorized transmitting number and party information for each telephonic device in a plurality of telephonic devices, the party information indicating whether the authorized transmitting number of a given telephonic device in the plurality of telephonic devices corresponds to the negotiator, a monitor in a first monitoring party having a first selected configuration, or a monitor in a second monitoring party having a second selected configuration, the first selected configuration of the first monitoring party differing from the second selected configuration of the second monitoring party;

receiving number information in response to a request from a target telephonic device in the plurality of telephonic devices to connect to the virtual number, the number information identifying the virtual number and a transmitting number of the target telephonic device;

authenticating the target telephonic device as a negotiator device based on a match between the transmitting number of the target telephonic device and the authorized transmitting number corresponding to the negotiator stored in association with the virtual number in the mapping table; and in response to authenticating the target telephonic device as the negotiator device, transmitting instructions for:

establishing, with the virtual number, bi-directional communications between the negotiator device and a subject device;

establishing, with the virtual number, a first monitoring connection to a monitoring device of the monitor in the first monitoring party based on the first selected configuration of the first monitoring party and the authorized transmitting number corresponding to the monitor in the first monitoring party; and establishing, with the virtual number, a second monitoring connection to a monitoring device of the monitor in the second monitoring party based on the second selected configuration of the second monitoring party and the authorized transmitting number corresponding to the monitor in the second monitoring party, the second monitoring connection differing from the first monitoring connection.

2. A computer based method for establishing communications between a negotiator and a subject, the method comprising:

storing, in association with a virtual number in a mapping table, an authorized transmitting number and party information for each telephonic device in a plurality of telephonic devices, the party information indicating whether the authorized transmitting number of a given telephonic device in the plurality of telephonic devices corresponds to the negotiator, the subject, a monitor in a first monitoring party having a first selected configuration, or a monitor in a second monitoring party having a second selected configuration, the first selected configuration of the first monitoring party differing from the second selected configuration of the second monitoring party;

receiving number information in response to a request from a target telephonic device in the plurality of telephonic devices to connect to the virtual number, the number information identifying the virtual number and a transmitting number of the target telephonic device;

authenticating the target telephonic device as a subject device based on a match between the transmitting number of the target telephonic device and the authorized transmitting number corresponding to the subject stored in association with the virtual number in the mapping table; and in response to authenticating the target telephonic device as the subject device, identifying the authorized transmitting number corresponding to the negotiator stored in association with the virtual number in the mapping table, and transmitting instructions for:

establishing, with the virtual number, bi-directional communications between the subject device and a negotiator device based on the authorized transmitting number corresponding to the negotiator;

establishing, with the virtual number, a first monitoring connection to a monitoring device of the monitor in the first monitoring party based on the first selected configuration of the first monitoring party and the authorized transmitting number corresponding to the monitor in the first monitoring party; and establishing, with the virtual number, a second monitoring connection to a monitoring device of the monitor in the second monitoring party based on the second selected configuration of the second monitoring party and the authorized transmitting number corresponding to the monitor in the second monitoring party, the second monitoring connection differing from the first monitoring connection.

3. A computer based method for establishing communications between a negotiator and a subject with a virtual number configured for crisis negotiations, the method comprising:

receiving number information in response to a request from a target telephonic device to connect to the virtual number, the number information identifying the virtual number and a transmitting number of the target telephonic device;

authenticating the target telephonic device as a negotiator device based on a match between the transmitting number of the target telephonic device and an authorized transmitting number corresponding to the negotiator stored in association with the virtual number in a mapping table; and in response to authenticating the target telephonic device as the negotiator device, transmitting instructions for:

establishing, with the virtual number, bi-directional communications between the negotiator device and a subject device;

establishing, with the virtual number, a first monitoring connection to a first monitoring device of a monitor in a first monitoring party based on first configuration options selected for the first monitoring party and an authorized transmitting number corresponding to the monitor in the first monitoring party stored in association with the virtual number in the mapping table; and establishing, with the virtual number, a second monitoring connection to a second monitoring device of a monitor in a second monitoring party based on second configuration options selected for the second monitoring party and the authorized transmitting number corresponding to the monitor in the second monitoring party stored in association with the virtual number in the mapping table, the second monitoring connection differing from the first monitoring connection.

4. The method of claim 3, further comprising:

provisioning the virtual number based on number information received for the virtual number;

receiving the first selection of configuration options for the first monitoring party;

receiving the second selection of configuration options for the second monitoring party;

receiving mapping information for the virtual number, the mapping information including an authorized transmitting number and party information for each of the negotiator device, the subject device, the first monitoring device, and the second monitoring device, the party information indicating whether the authorized transmitting number of a given telephonic device corresponds to the negotiator, the subject, the monitor in the first monitoring party, or the monitor in the second monitoring party;

storing, in association with the virtual number in the mapping table, the authorized transmitting numbers and party information.

5. The method of claim 4, wherein the first selection of configuration options is stored in association with the authorized transmitting number corresponding to the monitor in the first monitoring party and the second selection of configuration options is stored in association with the authorized transmitting number corresponding to the monitor in the second monitoring party.

6. The method of claim 3, wherein the instructions for establishing the first monitoring connection based on the first configuration options permit the first monitoring device to receive audio corresponding to the bi-directional communications.

7. The method of claim 6, wherein the instructions for establishing the second monitoring connection based on the second configuration options permit the second monitoring device to receive audio corresponding to the bi-directional communications and audio from the first monitoring device.

8. The method of claim 3, wherein the instructions for establishing the first monitoring connection based on the first configuration options establish bi-directional communications between the first monitoring device and a third monitoring device of a second monitor in the first party and permit the first monitoring device and the third monitoring device to receive audio corresponding to the bi-directional communications between the subject device and the negotiator device.

9. The method of claim 8, wherein the instructions for establishing the second monitoring connection based on the second configuration options permit the second monitoring device to receive audio corresponding to the bi-directional communications between the first monitoring device and the third monitoring device.

10. The method of claim 8, wherein the instructions for establishing the first monitoring connection prevent transmission of audio corresponding to the bi-directional communications between the first monitoring device and the third monitoring device to the negotiator device and the subject device.

11. The method of claim 3, further comprising authenticating the target telephonic device as the negotiator device based on a comparison of key-in information received from the target telephonic device with authorized key-in information associated with the authorized transmitting number corresponding to the negotiator in the mapping table.

12. The method of claim 3, further comprising:
receiving a transmitting number of the subject device from the negotiator device;
storing the transmitting number of the subject device as an authorized transmitting number corresponding to the subject in the mapping table; and
wherein the instructions for establishing the bi-directional communications between the negotiator device and a subject device comprise the transmitting number of the subject device.

13. The method of claim 12, further comprising providing a module to the negotiator device for interfacing with features of the negotiator device and performing at least one of:
a step for obtaining the transmitting number corresponding to subject device and the virtual number; and
a step for providing the transmitting number corresponding to the subject device through the virtual number.

14. A computer based method for establishing communications between a negotiator and a subject with a virtual number configured for crisis negotiations, the method comprising:
receiving number information in response to a request from a target telephonic device to connect to the virtual number, the number information identifying the virtual number and a transmitting number of the target telephonic device;
authenticating the target telephonic device as a subject device based on a match between the transmitting number of the target telephonic device and an authorized transmitting number corresponding to the subject stored in association with the virtual number in a mapping table; and
in response to authenticating the target telephonic device as the subject device, identifying an authorized transmitting number corresponding to the negotiator stored in association with the virtual number in the mapping table, and transmitting instructions for:
establishing, with the virtual number, bi-directional communications between the subject device and a negotiator device based on the authorized transmitting number corresponding to the negotiator;
establishing, with the virtual number, a first monitoring connection to a first monitoring device of a monitor in a first monitoring party based on first configuration options selected for the first monitoring party and an authorized transmitting number corresponding to the monitor in the first monitoring party stored in association with the virtual number in the mapping table; and
establishing, with the virtual number, a second monitoring connection to a second monitoring device of a monitor in a second monitoring party based on second configuration options selected for the second monitoring party and the authorized transmitting number corresponding to the monitor in the second monitoring party stored in association with the virtual number in the mapping table, the second monitoring connection differing from the first monitoring connection.

15. The method of claim 14, further comprising:
provisioning the virtual number based on number information received for the virtual number;
receiving the first selection of configuration options for the first monitoring party;
receiving the second selection of configuration options for the second monitoring party;
receiving mapping information for the virtual number, the mapping information including an authorized transmitting number and party information for each of the negotiator device, the subject device, the first monitoring device, and the second monitoring device, the party information indicating whether the authorized transmitting number of a given telephonic device corresponds to the negotiator, the subject, the monitor in the first monitoring party, or the monitor in the second monitoring party;
storing, in association with the virtual number in the mapping table, the authorized transmitting numbers and party information.

16. The method of claim 15, wherein the first selection of configuration options is stored in association with the authorized transmitting number corresponding to the monitor in the first monitoring party and the second selection of configuration options is stored in association with the authorized transmitting number corresponding to the monitor in the second monitoring party.

17. The method of claim 14, wherein the instructions for establishing the first monitoring connection based on the first configuration options permit the first monitoring device to receive audio corresponding to the bi-directional communications.

18. The method of claim 17, wherein the instructions for establishing the second monitoring connection based on the second configuration options permit the second monitoring device to receive audio corresponding to the bi-directional communications and audio from the first monitoring device.

19. The method of claim 14, wherein the instructions for establishing the first monitoring connection based on the first configuration options establish bi-directional communications between the first monitoring device and a third monitoring device of a second monitor in the first party and permit the first monitoring device and the third monitoring device to receive audio corresponding to the bi-directional communications between the subject device and the negotiator device.

20. The method of claim 19, wherein the instructions for establishing the second monitoring connection based on the second configuration options permit the second monitoring device to receive audio corresponding to the bi-directional communications between the first monitoring device and the third monitoring device.

21. The method of claim 19, wherein the instructions for establishing the first monitoring connection prevent transmission of audio corresponding to the bi-directional communications between the first monitoring device and the third monitoring device to the negotiator device and the subject device.

* * * * *

UNITED STATES PATENT AND TRADEMARK OFFICE
CERTIFICATE OF CORRECTION

PATENT NO.       : 9,609,120 B2                         Page 1 of 1
APPLICATION NO.  : 14/609995
DATED            : March 28, 2017
INVENTOR(S)      : Christopher Ryan Bennett It is certified that error appears in the above-identified patent and that said Letters Patent is hereby corrected as shown below:

In the Claims

Column no: 27, Line(s) no: 42-43, Claim: 2, "to the subject stored in" to read as -- to the subject device stored in --

Column no: 30, Line(s) no: 1-2, Claim: 14, "to the subject stored in" to read as -- to the subject device stored in --

Signed and Sealed this
Nineteenth Day of June, 2018

Andrei Iancu
*Director of the United States Patent and Trademark Office*